US012335941B2

(12) United States Patent
Dutta et al.

(10) Patent No.: US 12,335,941 B2
(45) Date of Patent: Jun. 17, 2025

(54) FEEDBACK TRANSMISSIONS WITH ADAPTIVE AND DYNAMIC SIDELINK COCHANNEL COEXISTENCE

(71) Applicant: QUALCOMM Incorporated, San Diego, CA (US)

(72) Inventors: Sourjya Dutta, San Diego, CA (US); Tien Viet Nguyen, Bridgewater, NJ (US); Gabi Sarkis, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 471 days.

(21) Appl. No.: 17/948,702

(22) Filed: Sep. 20, 2022

(65) Prior Publication Data

US 2024/0098730 A1    Mar. 21, 2024

(51) Int. Cl.
*H04W 72/12*    (2023.01)
*H04W 72/1263*    (2023.01)
*H04W 72/20*    (2023.01)

(52) U.S. Cl.
CPC ....... *H04W 72/1263* (2013.01); *H04W 72/20* (2023.01)

(58) Field of Classification Search
CPC . H04W 72/1263; H04W 72/02; H04W 72/40; H04W 72/542; H04W 72/12; H04W 72/121; H04W 72/1215; H04W 72/20; H04W 72/25; H04W 72/27; H04W 72/29; H04L 1/1861; H04L 1/1854
See application file for complete search history.

(56) References Cited

U.S. PATENT DOCUMENTS

| 2020/0252990 | A1* | 8/2020 | Ganesan | H04W 76/19 |
| 2020/0305169 | A1* | 9/2020 | Loehr | H04W 4/40 |
| 2022/0210768 | A1* | 6/2022 | Zhou | H04W 72/20 |
| 2022/0338259 | A1* | 10/2022 | Lin | H04W 72/0446 |
| 2024/0040594 | A1* | 2/2024 | Peng | H04W 72/25 |

FOREIGN PATENT DOCUMENTS

| CN | 116938415 A | * 10/2023 | H04L 5/0048 |
| WO | WO-2023036933 A1 | * 3/2023 | |

* cited by examiner

*Primary Examiner* — Phong La
(74) *Attorney, Agent, or Firm* — Holland & Hart LLP

(57) ABSTRACT

Methods, systems, and devices for wireless communications are described. A first user equipment (UE) may receive a sidelink message via a sidelink transmission resource of a shared sidelink resource pool that is shared between a communications according to a first radio access technology (RAT) and communications according to a second RAT. The UE may map sidelink transmission resource occasions of the shared resource pool to a physical sidelink feedback channel (PSFCH) occasion and map subchannels of the sidelink transmission occasions to respective resources of the PSFCH occasion. The UE may transmit a sidelink feedback message corresponding to the sidelink message using a resource of the PSFCH occasion corresponding to a subchannel carrying sidelink control information of the sidelink message.

30 Claims, 16 Drawing Sheets

FEEDBACK TRANSMISSIONS WITH ADAPTIVE AND DYNAMIC SIDELINK COCHANNEL COEXISTENCE

FIELD OF TECHNOLOGY

The following relates to wireless communications, including feedback transmissions with adaptive and dynamic sidelink cochannel coexistence.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

Wireless communications systems may support devices that communicate using different radio access technologies (RATs). For example, a first UE may communicate according to long-term-evolution (LTE) procedures, and second UE may communicate according to fifth generation (5G) or later procedures, which may be referred to new radio (NR). In some examples, the devices that communicate according to different radio access technologies may share some of the wireless spectrum.

SUMMARY

The described techniques relate to improved methods, systems, devices, and apparatuses that support feedback transmissions with adaptive and dynamic sidelink cochannel coexistence. For example, the described techniques provide for a first user equipment (UE) receiving a sidelink message via a sidelink transmission resource of a shared sidelink resource pool that is shared between a communications according to a first radio access technology (RAT) and communications according to a second RAT. The UE may map sidelink transmission resource occasions of the shared resource pool to a physical sidelink feedback channel (PSFCH) occasion and map subchannels of the sidelink transmission occasions to respective resources of the PSFCH occasion. The UE may transmit a sidelink feedback message corresponding to the sidelink message using a resource of the PSFCH occasion corresponding to a subchannel carrying sidelink control information of the sidelink message.

DETAILED DESCRIPTION

Figure 1:
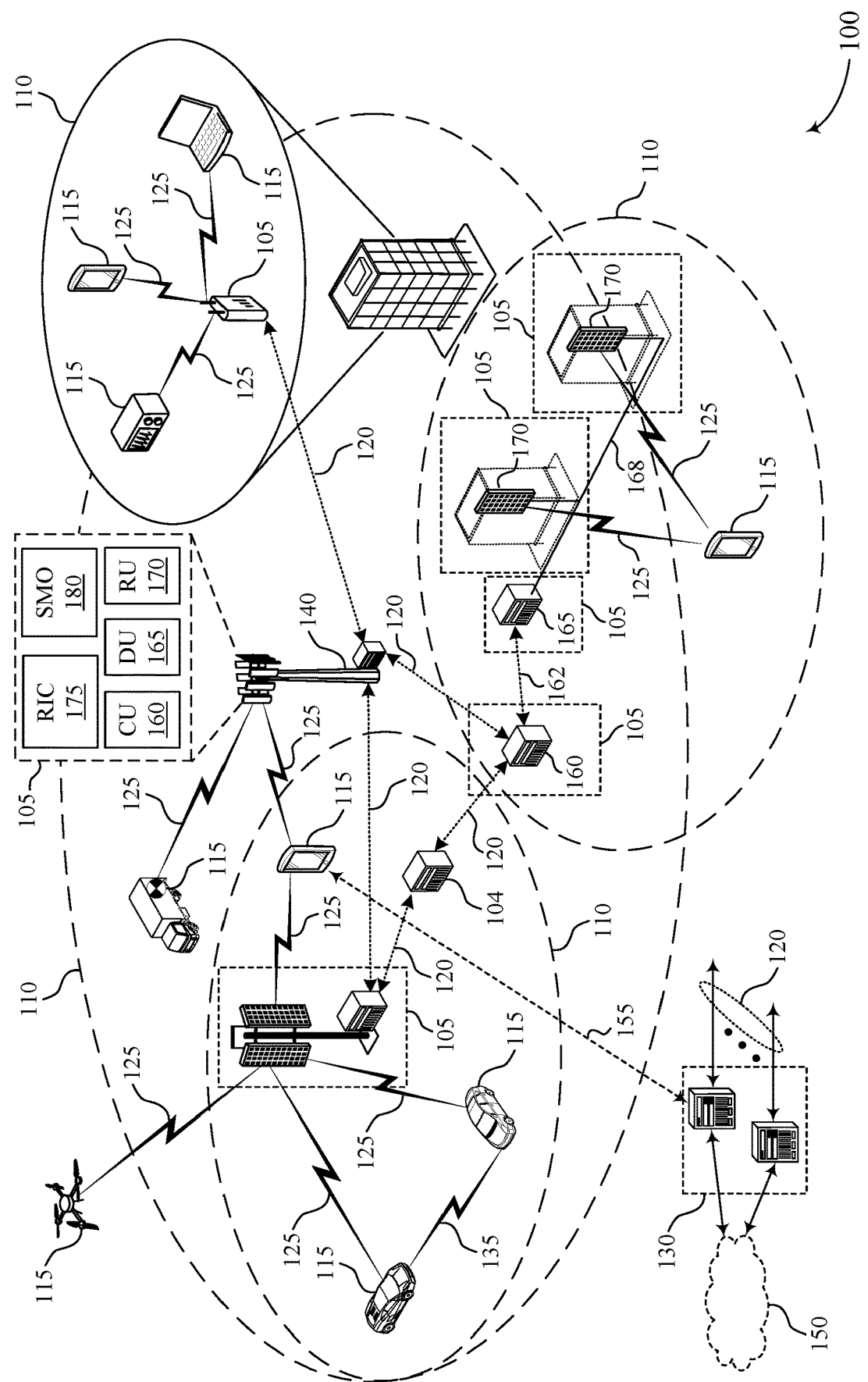
FIG. 1 illustrates an example of a wireless communications system that supports feedback transmissions with adaptive and dynamic sidelink cochannel coexistence in accordance with one or more aspects of the present disclosure.

Wireless communications systems may support devices that communicate using different radio access technologies (RATs). For example, a first UE may communicate according to long-term-evolution (LTE) procedures, and second UE may communicate according to fifth generation (5G) or later procedures, which may be referred to new radio (NR). In some examples, a device may support communications via LTE and NR procedures.

Due to scarcity of the radio frequency spectrum, NR devices and LTE devices may operate in the same channel. For example, NR vehicle-to-everything (V2X) sidelink communications and LTE V2X sidelink communications may occur in the same or overlapping channels. Some UEs (e.g., UEs that support NR techniques) may implement sidelink feedback (e.g., hybrid automatic repeat request (HARQ) feedback) techniques to improve reliability of robustness of sidelink communications, and the feedback may be transmitted on resources of a physical sidelink feedback channel (PSFCH). However, earlier RATs, such as LTE, may not support sidelink feedback. Instead, LTE techniques may implement sidelink message repetition. When such devices operate over shared resources, the presence of PSFCH transmissions may degrade LTE communications over the shared resources. Further, as sidelink feedback may not be supported for LTE communications, the LTE devices may not be able to identify when the PSFCH resources are to occur.

Techniques described herein support dynamically determining PSFCH resources by devices that support sidelink feedback. The PSFCH resources may be determined based on an estimation of sidelink transmission resource availability in a sidelink resource pool that is shared by two RATs. A sidelink UE may determine or estimate the sidelink transmission resources based on analysis of various traffic metrics (e.g., metrics for one or both RATs), and map sidelink transmission resources to a PSFCH occasion in the shared resource pool. The mapping may be based on a time domain position of the sidelink transmission resources in the shared resource pool and processing constraints. In some examples, multiple sidelink transmission occasions may be mapped to a same PSFCH occasion. To identify a resource of the PSFCH to use for transmission of feedback corresponding to a sidelink message received in a transmission occasion, a UE may map subchannels of the sidelink transmission occasions, starting with the earliest sidelink transmission occasion in the shared resource pool, to respective resources of the PSFCH. To support such mapping, the UE may enumerate (e.g., assign numbers to) the subchannels of the sidelink transmission occasions and map the subchannels to the respective resources using the enumeration (e.g., the respective numbers).

As described herein, two sidelink UEs may estimate the PSFCH occasions for a shared resource pool based on the resource availability estimation techniques described herein. In some examples, the estimations may be different based on different determinations of resource availability. In such cases, a UE that is transmitting a sidelink message (e.g., a physical sidelink shared channel (PSSCH) message or a physical sidelink control channel (PSCCH) message) may indicate the estimation of the PSFCH occasions to the receiving UE using control signaling (e.g., sidelink control information (SCI)). In such cases, the receiving UE may derive transmission resources based on the indicated PSFCH occasions. The receiving UE may map the transmission occasions to the PSFCH resources as described herein, and transmit feedback corresponding to the sidelink message in the mapped resource.

Additional techniques described herein may support adaptive scaling of sidelink transmission resources and PSFCH occasions based on control signaling between sidelink UEs and based on resource availability estimations. Other techniques support transmitting conflict indications in a PSFCH occasions of a shared resource pool, and use of a basic set of PSFCH occasions in a shared resource pool. These and other techniques are described in further detail with respect to the figures.

Aspects of the disclosure are initially described in the context of wireless communications systems. Aspects of the disclosure are further described with respect to various resource diagrams illustrating shared sidelink resource pool usage and a process flow diagram. Aspects of the disclosure are further illustrated by and described with reference to apparatus diagrams, system diagrams, and flowcharts that relate to feedback transmissions with adaptive and dynamic sidelink cochannel coexistence.

FIG. 1 illustrates an example of a wireless communications system 100 that supports feedback transmissions with adaptive and dynamic sidelink cochannel coexistence in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

In the case of the techniques described herein applied in the context of a disaggregated RAN architecture, one or more components of the disaggregated RAN architecture may be configured to support feedback transmissions with adaptive and dynamic sidelink cochannel coexistence as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

In some examples, such as in a carrier aggregation configuration, a carrier may also have acquisition signaling or control signaling that coordinates operations for other carriers. A carrier may be associated with a frequency channel (e.g., an evolved universal mobile telecommunication system terrestrial radio access (E-UTRA) absolute RF channel number (EARFCN)) and may be identified according to a channel raster for discovery by the UEs 115. A carrier may be operated in a standalone mode, in which case initial acquisition and connection may be conducted by the UEs 115 via the carrier, or the carrier may be operated in a non-standalone mode, in which case a connection is anchored using a different carrier (e.g., of the same or a different radio access technology).

The communication links 125 shown in the wireless communications system 100 may include downlink transmissions (e.g., forward link transmissions) from a network entity 105 to a UE 115, uplink transmissions (e.g., return link transmissions) from a UE 115 to a network entity 105, or both, among other configurations of transmissions. Carriers may carry downlink or uplink communications (e.g., in an FDD mode) or may be configured to carry downlink and uplink communications (e.g., in a TDD mode).

A carrier may be associated with a particular bandwidth of the RF spectrum and, in some examples, the carrier bandwidth may be referred to as a "system bandwidth" of the carrier or the wireless communications system 100. For example, the carrier bandwidth may be one of a set of bandwidths for carriers of a particular radio access technology (e.g., 1.4, 3, 5, 10, 15, 20, 40, or 80 megahertz (MHz)). Devices of the wireless communications system 100 (e.g., the network entities 105, the UEs 115, or both) may have hardware configurations that support communications using a particular carrier bandwidth or may be configurable to support communications using one of a set of carrier bandwidths. In some examples, the wireless communications system 100 may include network entities 105 or UEs 115 that support concurrent communications using carriers associated with multiple carrier bandwidths. In some examples, each served UE 115 may be configured for operating using portions (e.g., a sub-band, a BWP) or all of a carrier bandwidth.

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

One or more numerologies for a carrier may be supported, and a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the network entities 105 or the UEs 115 may be expressed in multiples of a basic time unit which may, for example, refer to a sampling period of $T_s=1/(\Delta f_{max} \cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., N f) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may support synchronous or asynchronous operation. For synchronous operation, network entities 105 (e.g., base stations 140) may have similar frame timings, and transmissions from different network entities 105 may be approximately aligned in time. For asynchronous operation, network entities 105 may have different frame timings, and transmissions from different network entities 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a network entity 105 (e.g., a base station 140) without human intervention. In some examples, M2M communication or MTC may include communications from devices that integrate sensors or meters to measure or capture information and relay such information to a central server or application program that uses the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

In some systems, a D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., network entities 105, base stations 140, RUs 170) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The UEs 115 and the network entities 105 may support retransmissions of data to increase the likelihood that data is received successfully. Hybrid automatic repeat request (HARQ) feedback is one technique for increasing the likelihood that data is received correctly via a communication link (e.g., a communication link 125, a D2D communication link 135). HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, in which case the device may provide HARQ feedback in a specific slot for data received via a previous symbol in the slot. In some other examples, the device may provide HARQ feedback in a subsequent slot, or according to some other time interval.

As described herein, various devices of the wireless communications system 100 may operate using one or more different RATs. Additionally, due to spectrum scarcity, different RATs may operate in the same wireless spectrum. For example, LTE V2X sidelink communications and NR V2X sidelink communications may use a shared sidelink resource pool. However, the different RATs may use different techniques, which may impact the communications on the shared resources. For example, NR V2X sidelink may support sidelink feedback transmissions (e.g., HARQ transmissions), and the sidelink feedback transmissions may be communicated on PSFCH resources. However, LTE V2X sidelink may not support sidelink feedback transmissions, and as such, an LTE device may not be able to identify when PSFCH transmissions are to occur in a shared resource pool. The PSFCH transmissions may degrade or interfere with LTE communications in the shared resource pool.

Techniques described herein support dynamic sidelink resource determination for NR sidelink transmissions and corresponding PSFCH transmissions. The sidelink transmission resource and PSFCH occasion determinations may be based on an estimation of resource availability in the resource pool. Additional techniques described herein support a sidelink transmitting UE 115 indicating determined PSFCH occasions to a receiving UE 115. The receiving UE 115 may use the indication to derive transmission resources. Techniques described herein also support mapping of determined sidelink transmission resources to PSFCH occasions of the shared resource pool and determining a resource of a PSFCH occasion in which to transmit a sidelink feedback message corresponding to a received sidelink message.

As such, using the techniques described herein, UEs 115 may operate using a first RAT (e.g., NR) in a shared spectrum for sidelink communications in a manner that limits or reduces interference with communications via another RAT (e.g., LTE) by other UEs 115. Accordingly, the techniques described herein may improve utilization limited of resources while reducing interference.

Figure 2:
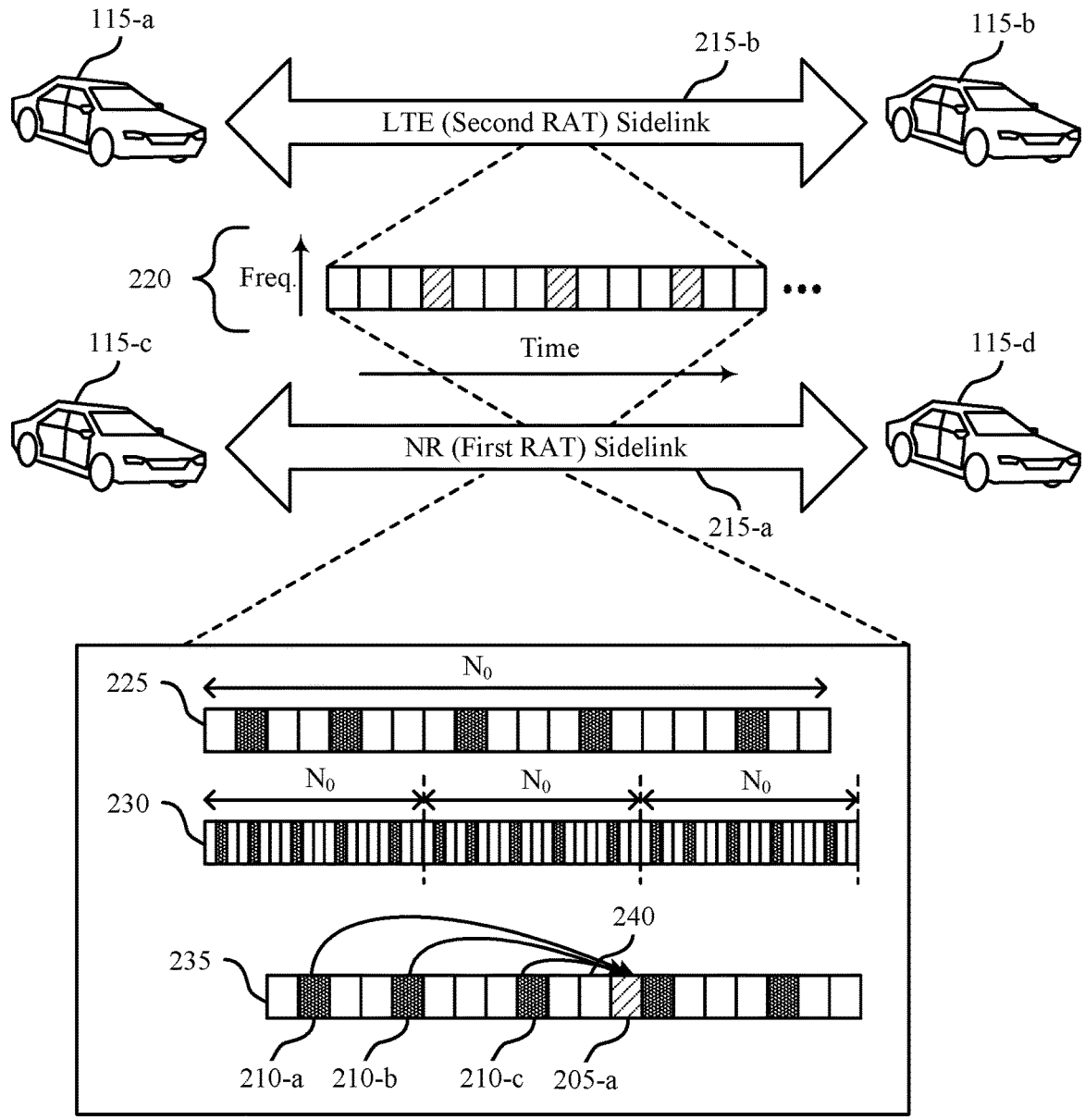
FIG. 2 illustrates an example of a wireless communications system that supports feedback transmissions with adaptive and dynamic sidelink cochannel coexistence in accordance with one or more aspects of the present disclosure.

FIG. 2 illustrates an example of a wireless communications system 200 that supports feedback transmissions with adaptive and dynamic sidelink cochannel coexistence in accordance with one or more aspects of the present disclosure. The wireless communications system 200 includes a UE 115-a, a UE 115-b, a UE 115-c, and a UE 115-d, which may be examples of the UEs 115 as described with respect to FIG. 1. FIG. 2 illustrates examples of sidelink communications 215 between the UEs 115 using a dynamic shared sidelink resource pool partition 220. More particularly, FIG. 2 illustrates sidelink communications 215-a between the UE 115-c and the UE 115-d using a first RAT (e.g., NR) and sidelink communications 215-a between the UE 115-a and the UE 115-b using a second RAT (e.g., LTE) over the dynamic shared sidelink resource pool partition 220.

As described herein, due to scarcity of the wireless communications spectrum, NR V2X (e.g., the sidelink communications 215-a) and LTE V2X (e.g., the sidelink communications 215-b) may operate in a same channel (e.g., the dynamic shared sidelink resource pool partition 220). In the absence of any coordination mechanism, NR V2X transmissions may collide with LTE V2X communications, as the communications may occupy the same time/frequency resources. As such, both communications may be degraded.

In some examples, a NR V2X device (e.g., UE 115-c) may be a dual-radio device such that the device transmits basic safety message (BSM) packets and coordinated automotive message (CAM) packets using LTE V2X procedures and transmit sensor traffic or other traffic using NR V2X procedures. As such, coordination between NR V2X and LTE V2X procedures may use a resource pool partition, where NR V2X communications may access a channel in one or more transmission time intervals (TTIs) (one or more slots) and LTE V2X procedures may access the channel in one or more other TTIs (one or more other slots). but configuring this resource partition (in a static or semi-static manner) is challenging as it may require reconfiguring legacy and already deployed LTE devices and configuring cannot adapt to instantaneous changes in the system, especially in the out-of-coverage sidelink operation modes.

Dynamic resource pool sharing between NR sidelink and LTE sidelink may be enabled by the NR V2X devices determining a the shared sidelink resource pool partition 220, and the dynamic shared sidelink resource pool partition 220 may be adaptable based on changes in traffic over both NR and LTE. In some cases, no changes are contemplated for the LTE procedures. As such, the techniques described herein may support dynamic resource sharing for cochannel coexistence between multiple RATs. For a type A device (e.g., devices that contain both LTE sidelink and NR sidelink components), the NR sidelink component may use sensing and resource reservation information that may be shared by the LTE sidelink component to determine the resource availability in the shared resource pool and adapt the dynamic shared resource pool partition 220 accordingly.

As described herein, feedback may be used to improve reliability in wireless communications systems. However, LTE communications may not support sidelink feedback. Rather, sidelink transmissions over LTE may use two blind transmissions without feedback, which may be suitable for basic broadcast services but may not provide reliability guarantees required for advance services like sensor information sharing. NR sidelink (e.g., Rel. 16 and beyond) may use HARQ-feedback based sidelink retransmissions, which may support advanced traffic types (e.g., larger packets and lower latencies), while maintaining high reliability. Sidelink feedback may utilize periodic resources for feedback transmissions, such as PSFCH occasions 205. In NR, PSFCH resources (e.g., PSFCH occasions 205) may be configured in every 1, 2, or 4 slots of a resource pool. The PSFCH occasions 205 may correspond to a slot format that includes a first set of symbols (e.g., symbols 11 and 12) that are allocated for feedback transmissions over PSFCH (symbol 10 may be used for automatic gain control (AGC) settling) and a second set of symbols (for example symbols 1 to 9) for SL data and control transmissions.

Presence of PSFCH resources in a pool shared with LTE (e.g., dynamic shared sidelink resource pool partition 220) may result in, without coordination, NR PSFCH transmissions that may degrade the reliability of LTE transmissions. That is, as the PSFCH is localized over a set of symbols within a TTI, the LTE receiver will detect a change in the received power over the two sets of symbols and this will necessitate a change in AGC settling at the LTE UE. In such cases, a LTE transmission during this PSFCH slot will not be decodable at the other LTE devices.

As described herein, NR devices may determine transmission resources of shared resource pool (e.g., dynamic shared sidelink resource pool partition 220) based on an estimation of resources that may be available for NR. The estimation of resource availability may be based on LTE channel occupancy and/or NR traffic requirements. Type A NR devices may obtain such information from a co-located LTE component and using NR or LTE measurements. In some examples, NR transmission resources (e.g., sidelink transmission resources 210) may occur periodically such that the LTE devices may avoid the resources based on RSSI measurements. Techniques described herein support efficient scheduling of PSFCH resources in a resource pool shared by a first RAT (e.g., NR) and a second RAT (e.g., LTE).

The UE 115-c and the UE 115-d may communicate over a basic set 225 of sidelink transmission resources 210. In some examples, the basic set 225 may be configured (e.g., via a network entity 105 of FIG. 1) at the UEs 115-a via control signaling or may be part of UE pre-configuration. The basic set 225 may be periodic or configured in a repeating pattern 230. Each sidelink transmission resource 210 may correspond to a TTI, such as a slot. The UEs 115-c and UE 115-d may also be configured with a basic set of PSFCH resources. The dynamic shared sidelink resource pool partition 220 illustrates an example of a basic set of PSFCH resources (e.g., PSFCH occasions 205). Each PSFCH occasion 205 may correspond to a slot that includes PSFCH resources.

The NR UEs 115-c and 115-d, which may operate in the dynamic shared sidelink resource pool partition 220 that is configured for dynamic NR and LTE coexistence, may map sidelink transmission resources 210 to PSFCH occasions 205 in a manner that satisfies processing time constraints. Mapping the sidelink transmission resources 210 may correspond to identifying the PSFCH occasion 205 that may be used to transmit feedback corresponding to a sidelink message transmitted via a sidelink transmission resource 210.

As illustrated in resource diagram 235, the UEs 115-c and 115-d may map the sidelink transmission resources 210-a, 210-b, and 210-c to PSFCH occasion 205, which means that if one of the UEs 115-c or 115-d receives a sidelink transmission in one of the sidelink transmission resources 210-a, 210-b, or 210-c, the receiving UE may transmit feedback corresponding to the sidelink transmission using a resource of the PSFCH occasion 205-a. As described herein, a UE 115 may consider processing constraints when mapping sidelink transmission resources 210 to a PSFCH occasion 205. For example, if a transmission time interval 240 is determined to be a sidelink transmission occasion, then the corresponding feedback may not be transmittable in PSFCH occasion 205 due to processing time constraints. In such cases, the feedback corresponding to a sidelink transmission transmitted via transmission time interval 240 may be transmitted in a PSFCH occasion 205 subsequent to PSFCH occasion 205-a. Techniques described in further detail herein support dynamic scaling of sidelink transmission resources, indicating identified resources to avoid resource mismatches, subchannel to PSFCH resource mapping, resource indications, among other techniques.

Figure 3:
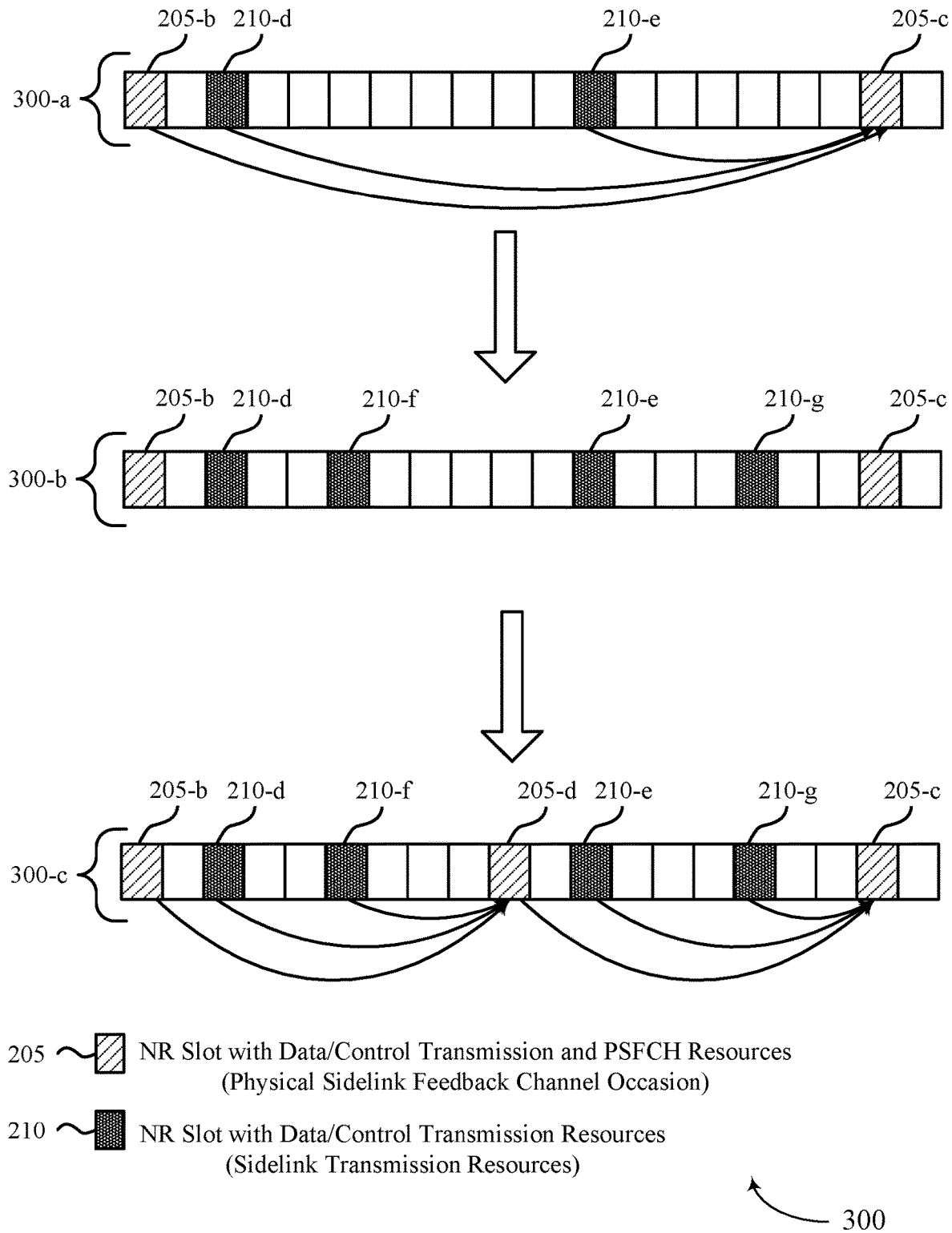
FIG. 3 illustrates an example of a resource diagram that supports feedback transmissions with adaptive and dynamic sidelink cochannel coexistence in accordance with one or more aspects of the present disclosure.

FIG. 3 illustrates an example of a resource diagram 300 that supports feedback transmissions with adaptive and dynamic sidelink cochannel coexistence in accordance with one or more aspects of the present disclosure. The resource diagram 300 may be implemented by one or more UEs 115, as described with respect to FIGS. 1 and 2. For example, the resource diagram 300 illustrates example procedures for dynamically scaling a shared sidelink resource pool that is shared between a first RAT (e.g., NR) and a second RAT (e.g., LTE). UEs 115 that are capable of communicating according to NR (or later) procedures may implement the techniques described with respect to FIG. 3 to identify communication resources in the shared resource pool.

As described with respect to FIG. 2, the UE may identify sidelink transmission resources 210 and map the transmission occasions of the sidelink transmission resources 210 to the PSFCH occasions 205. For example, sidelink transmission resources 210-d and 210-e are mapped to PSFCH occasion 205-c as illustrated in resource diagram 300-a. Additionally, transmission resources of PSFCH occasion 205-b are mapped to the PSFCH occasion 205-c. As described herein, the PSFCH occasion may be an example of a slot that includes PSSCH and PSCCH resources, in addition to PSFCH resources (e.g., in two symbols of the slot). Thus, the PSSCH and PSCCH resources of the PSFCH occasion 205-b are mapped to the PSFCH occasion 205-c for transmission of feedback corresponding to a sidelink message transmitted in the PSSCH resources and/or PSCCH resources of the PSFCH occasion 205-b.

In some cases, a UE may dynamically add or determine the PSFCH resources of the shared resource pool. For example, the UE may estimate resource availability in the shared resource pool for communications via the first RAT (e.g., NR) and determine PSFCH resources based on the resource availability estimation. The resource availability estimation may be an estimation of a ratio of first RAT communications to second RAT communications in the shared sidelink resource pool (e.g., NR-to-LTE ratio), which may be referred to as $R_0$. $R_0$ may be defined as the ratio of the quantity of NR devices to the quantity of LTE devices (e.g., using the shared sidelink resource pool), the ratio of channel occupancy of NR devices to LTE devices, the ratio of traffic intensity of NR devices to LTE devices, or the ratio of channel measurements, the ratio of congestion measurements, or a combination thereof. In one examples, the determined resource availability may be mapped to the PSFCH occasions for the resource pool. An example mapping of $R_0$ to PSFCH occasions in a set of 20 slots enumerated from 0 to 19 for a resource pool 220 with PSFCH resources configured every 4 slots is demonstrated in the following Table 1:

TABLE 1

| $R_0$ | PSFCH Set |
|---|---|
| [0.00-0.2] | {19} |
| [0.21-0.4] | {11, 19} |
| [0.41-0.6] | {3, 11, 19} |
| [0.61-0.8] | {3, 7, 11, 19} |

Thus, a range of possible $R_0$ estimations are mapped to a set of PSFCH occasion index. Each PSFCH occasion index corresponds to a transmission time interval (e.g., slot) in the shared sidelink resource pool. Thus, if a UE determines a $R_0$ value of 0.44, then the UE may select the set of PSFCH occasions of the shared resource pool as slots 3, 11, and 19 in the set of 20 slots indexed from 0 to 19.

After selecting PSFCH occasions 205 in the resource pool, a UE may select non-PSFCH resources (e.g., sidelink transmission resources 210) based on the quantity of PSFCH occasions 205. In some examples, the UEs may select the sidelink transmission resources 210 such that an equal or balanced quantity of sidelink transmission resources 210 are mapped to the PSFCH occasions 205. Additionally, or alternatively, the UEs may select the sidelink transmission resources 210 such that a maximum PSFCH overload fraction is maintained. More particularly, the sidelink transmission resources 210 may be selected such that one of the PSFCH occasions 205 is not allocated a large fraction (e.g., greater than a threshold percentage) of sidelink transmission resources 210. In such cases, the sidelink transmission resources 210 per PSFCH occasion 205 may not be qual, but one PSFCH occasion 205 may not be overloaded (relative to other PSFCH occasions 205) with sidelink transmission resources 210.

Additionally, or alternatively, the UEs may select or add PSFCH occasions 205 from the shared sidelink resource pool based on a value for a parameter (e.g., maxPSSCH-mapped-PSFCH), which may be configured at the UE (e.g., via control signaling from a network entity). The value or parameter may indicate the maximum quantity of PSSCH slots/resources that may be mapped to one PSFCH occasion 205. As illustrated in FIG. 2, the UE updates the resource pool as shown in resource diagram 300-b to add additional sidelink transmission resources 210-f and 210-g. The UE updates the sidelink transmission resources 210 based on an $R_0$ estimation, for example. If the value for the parameter (e.g., maxPSSCH-mapped-PSFCH) is four, then all of the sidelink transmission resources 210-d, 210-e, 210-f, 210-g, and the sidelink transmission resources of PSFCH occasion 205-b cannot be mapped to the PSFCH occasion 205-c. That is, because there are more than four TTIs (e.g., slots) that include sidelink transmission resources the parameter is violated. As such, as shown in resource diagram 300-c, the UE adds an additional PSFCH occasion 205-d. After addition of the PSFCH occasion 205-d, the UE may remap the sidelink transmission resources 210 and the sidelink transmission resources of the PSFCH occasion 205-b to corresponding PSFCH occasions 205, as described herein. Accordingly, the UE may dynamically update sidelink transmission resources 210 and/or PSFCH occasions 205 based on resource availability estimations and mapping constraints.

Figure 4:
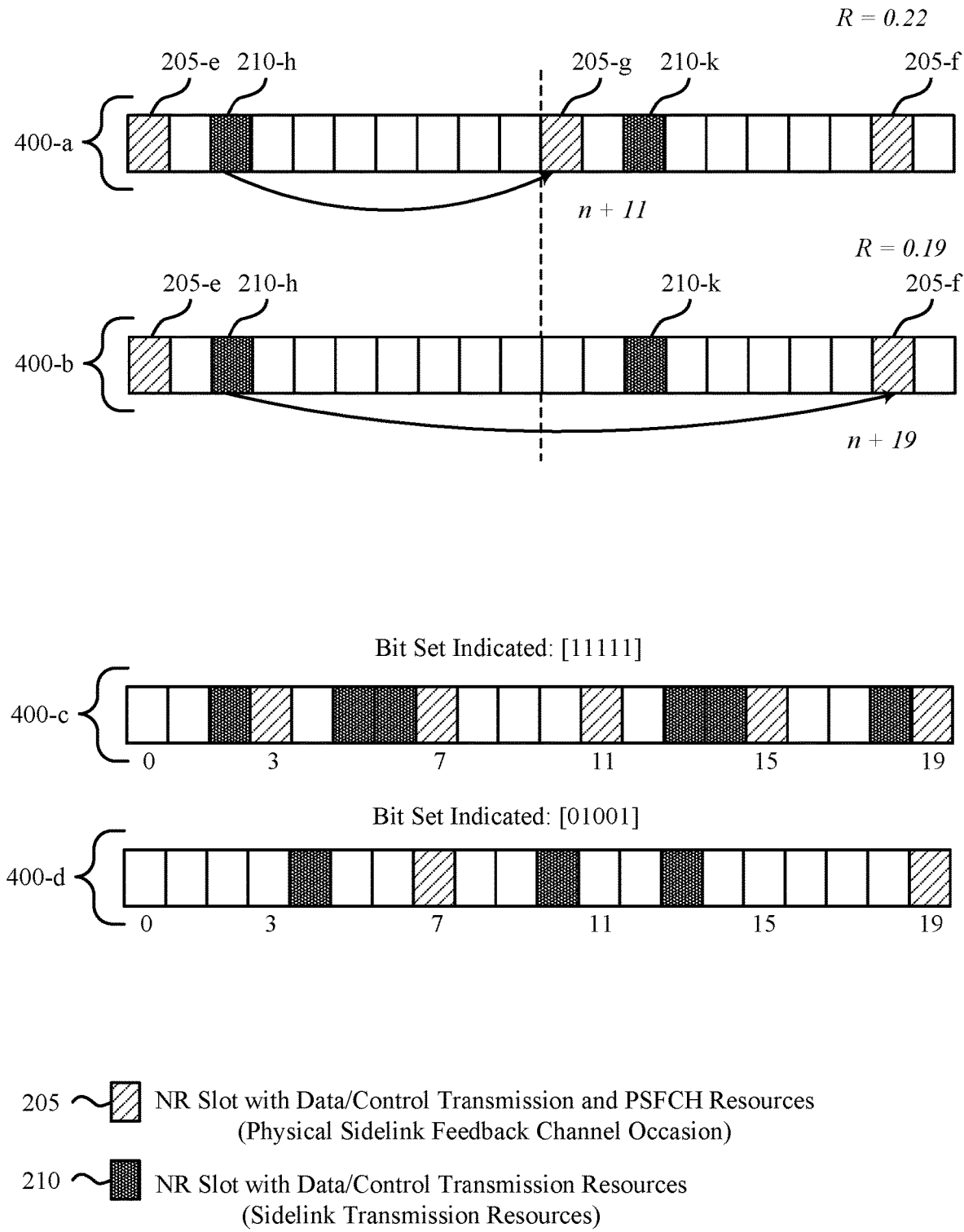
FIG. 4 illustrates an example of a resource diagram that supports feedback transmissions with adaptive and dynamic sidelink cochannel coexistence in accordance with one or more aspects of the present disclosure.

FIG. 4 illustrates an example of a resource diagram 400 that supports feedback transmissions with adaptive and dynamic sidelink cochannel coexistence in accordance with one or more aspects of the present disclosure. The resource diagram 400 may be implemented by one or more UEs 115, as described with respect to FIGS. 1 and 2. For example, the resource diagram 400 illustrates example procedures for dynamically avoiding mismatches between identified resources of a shared sidelink resource pool that is shared between a first RAT (e.g., NR) and a second RAT (e.g., LTE). UEs 115 that are capable of communicating according to NR (or later) procedures may implement the techniques described with respect to FIG. 4 to avoid conflicts in dynamically identified resources in a shared sidelink resource pool.

For example, a UE may estimate the resource availability for the sidelink resource pool as R=0.22, as shown in resource diagram 400-a. Using Table 1, as described herein, a first UE 115 may identify PSFCH occasions 205-g and 205-f in slot indexes 11 and 19, respectively. A second UE 115, which the first UE 115 may be communicating with via sidelink, may estimate the resource availability for the same sidelink resource pool as R=0.18, which results in identification of PSFCH occasion 205-f, as illustrated in resource diagram 400-b. In such cases, if the one of the UEs were to transmit a sidelink message via sidelink transmission resource 210-h, then the mapped PSFCH occasions 205 may be mismatched. For example, the first UE 115 may map sidelink transmission resource 210-h to PSFCH occasion 205-g (n+11), and the second UE 115 may map sidelink transmission resource 210-h to PSFCH occasion 205-f (n+19). Thus, mismatches may occur when UEs communicating with each other have differences in the estimation of the quantity of NR (first RAT) resources.

To avoid such mismatches, a transmitting UE 115 (e.g., a UE transmitting a sidelink message) may transmit additional bits in sidelink control information (SCI) to indicate the expected transmission set assumption. For example, when the PSFCH resource set is based on the estimation of $R_0$, as described herein, then the transmitting UE may indicate the expected transmission resource set using an n bit index in the SCI (e.g., SCI-1 or SCI-2). An index may be mapped to a PSFCH resource set. An example index to PSFCH resource set mapping is demonstrated in the following Table 2:

TABLE 2

| $R_0$ | PSFCH Set | Index |
|---|---|---|
| [0.00-0.2] | {19} | 00 |
| [0.21-0.4] | {11, 19} | 01 |
| [0.41-0.6] | {3, 11, 19} | 10 |
| [0.61-0.8] | {3, 7, 11, 19} | 11 |

Such a table may be configured at the UE, such as via control signaling by a network entity (e.g., using RRC signaling). Additionally, the bits used to indicate the PSFCH index may be configured at the UE, such as via control signaling by a network entity (e.g., using RRC signaling). The possible PSFCH positions may be different than those demonstrated and illustrated. Additionally or alternatively, a multibit bitmap may be signaled in the SCI to indicate the expected PSFCH resources. For example, as illustrated in resource diagram 400-c, a bitmap of indicates that each of slots 3, 7, 11, 15, and 19 are PSFCH occasions 205. As another example, as illustrated in resource diagram 400-d, a bitmap of indicates that slots 3 and 19 in the $N_0$=20 slot period are expected for PSFCH occasions 205. The No slot period (e.g., 20 slots) is illustrates as an example shared resource pool partitional, and it should be understood hat the techniques described herein may be applicable to other sets of slots with varying lengths. The bits used for the bitmap may be configured at the UE, such as by a network entity via control signaling (e.g., RRC). Additionally the bit position to slot position mapping may be different than as illustrated and may be configurable. When a receiver UE detects the control bits (e.g., the indication) in the SCI from a transmitting UE, the receiving UE may map the PSFCH resources based on the slots indicated by the transmitter, if different from the receiver UE's estimated PSFCH resources. In some examples, the receiving UE may update the transmission resource set to align the resource set with the transmitter UE. Additionally, the transmitter UE and the receiver UE may map the sidelink transmission resources to the indicated PSFCH occasions 205, as described herein.

Figure 5:
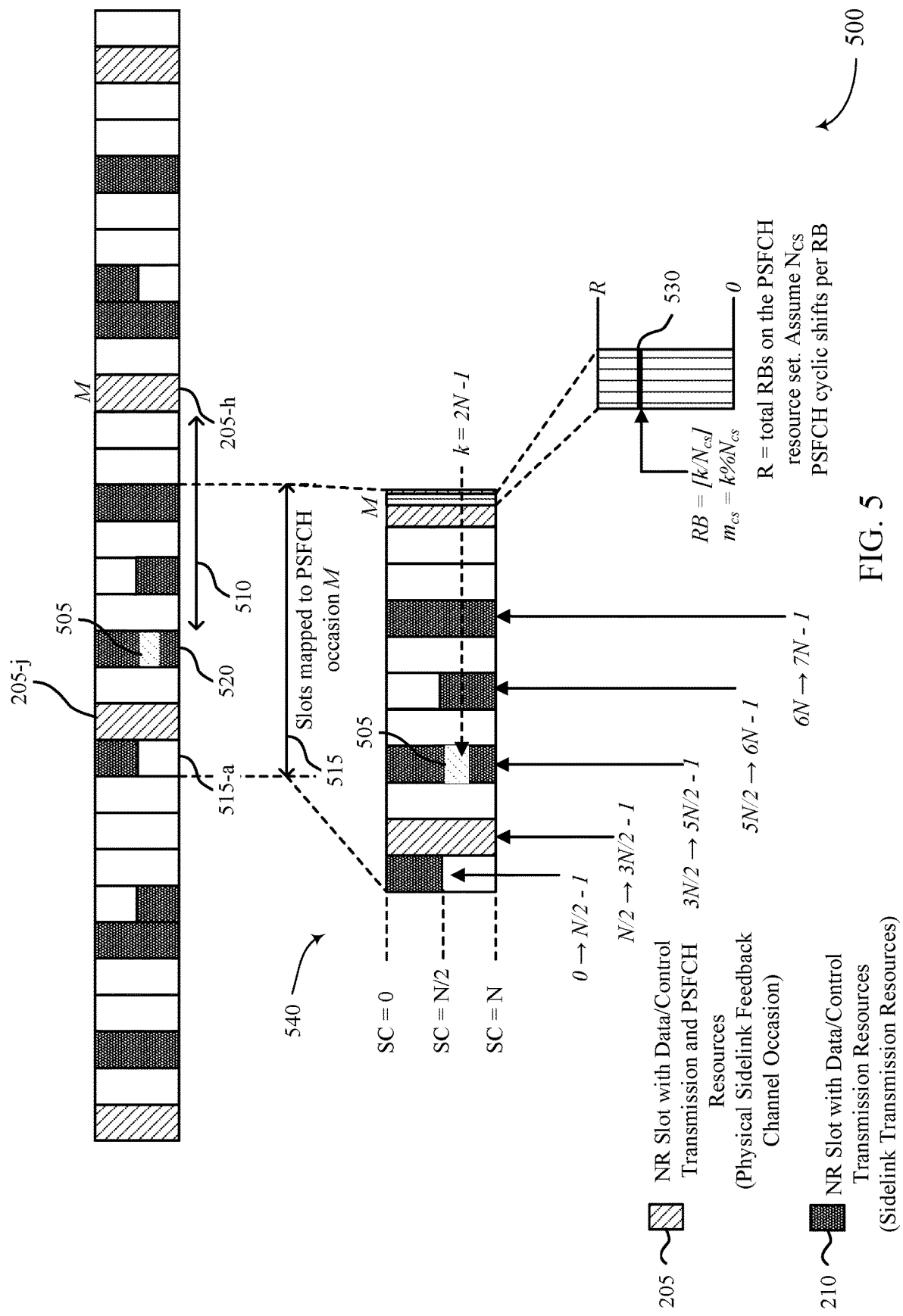
FIG. 5 illustrates an example of a resource diagram that supports feedback transmissions with adaptive and dynamic sidelink cochannel coexistence in accordance with one or more aspects of the present disclosure.

FIG. 5 illustrates an example of a resource diagram 500 that supports feedback transmissions with adaptive and dynamic sidelink cochannel coexistence in accordance with one or more aspects of the present disclosure. The resource diagram 500 may be implemented by one or more UEs 115, as described with respect to FIGS. 1 and 2. For example, the resource diagram 500 illustrates example procedures for dynamically mapping sidelink transmission occasions to PSFCH occasions of a shared sidelink resource pool that is shared between a first RAT (e.g., NR) and a second RAT (e.g., LTE). UEs 115 that are capable of communicating according to NR (or later) procedures may implement the techniques described with respect to FIG. 5 to identify PSFCH resources to use for transmission of feedback corresponding to a sidelink message.

As described with respect to FIG. 4, an NR sidelink receiving UE may determine the transmitter assumption for the set of sidelink transmission resources 210. In one example, the assumption may be the same as the assumption of the set of sidelink transmission resources 210 of the receiving UE. Additionally, or alternatively, the assumption of the receiving UE may be based on an explicit indication of the transmission resource set by the transmitter (e.g., based on the PSFCH occasion indication, as described with respect to FIG. 4). As such, the transmitting UE and the receiving UE may identify sidelink transmission resources 210 and PSFCH occasions 205 using the techniques herein. Additionally, the UE may map the sidelink transmission resources 210 to the PSFCH occasions 205 using the techniques described herein. As illustrated, the transmission resources 205 of slots 515 are mapped to PSFCH occasion 205-h. The UE may then map subchannels of the sidelink transmission resources 210 to sidelink feedback resources of the PSFCH occasion 205-h such that the UE is able to identify where to transmit feedback (e.g., acknowledgment (ACK) or negative acknowledgment (NACK)) corresponding to a received sidelink message in a sidelink transmission resource 210.

In some examples, the UEs map the sidelink transmission resources 210 (e.g., sidelink transmission occasions of the sidelink transmission resources 210) to respective PSFCH occasions in response to receiving a sidelink message in one of the sidelink transmission resources 210. In response to receiving a sidelink message (e.g., sidelink message 505), the UE may determine the PSFCH occasion 205-h that is at least $T_{PSFCH}^{Prep}$, away from the slot (e.g., slot 520) in which the sidelink message 505 is received. The UE may then enumerate (e.g., assign numbers to) all of the resources (subchannels) in the set of sidelink transmission occasions 210 that map to the PSFCH occasion 205-h, which includes the sidelink transmission resources 210 (and sidelink transmission resources of the PSFCH occasion 205-j) in the slots 515. The UE enumerates (e.g., assigns respective numbers to) the subchannels of the sidelink transmission occasions, starting with the earliest TTI (slot) that includes sidelink transmission resources 210 that map to the PSFCH occasion. In the illustrated example, the earliest TTI with the sidelink transmission resources 210 that maps to the PSFCH occasion 205-h is slot 515-a. The UE may enumerate (e.g., assign numbers to) the sidelink transmission resources 210 per slot starting with the lowest subchannel to the highest subchannel in the transmission resources in the slot.

A diagram 540 illustrates the enumeration of sidelink transmission resources 510 within the slots 515 that are mapped to the PSFCH occasion 205-h. As illustrated in the diagram 540, the first slot 515-a includes sidelink transmission resources that account for half of the slot from a frequency domain perspective. The subchannels of the sidelink transmission resources of slot 515 are numbered 0 to N/2−1. The sidelink transmission resources of PSFCH occasion 205-j are numbered $$\frac{N}{2} \text{ to } \frac{3N}{2} - 1.$$

Enumerations for remaining slots 515 are illustrated in diagram 540. To identify the PSFCH resource to use for transmission of feedback corresponding to the sidelink message 505, the UE identifies the number of the subchannel in which the SCI corresponding to the sidelink message 505 is received. That is, the sidelink message (e.g., the PSSCH message) may be transmitted over multiple subchannels. The subchannel that indicates the mapping to the PSFCH is the lowest subchannel which carries the SCI. As such, under the assumption that the SCI of the sidelink message 505 is received in the k-th channel of the sidelink occasions mapped to the PSFCH occasion 205-h, the k-th sidelink feedback resource (e.g., PSFCH resource) in the PSFCH resource set of the PSFCH occasion 205-h is used to transmit the corresponding feedback. The sidelink resources of the PSFCH resource set may include a total quantity of resource blocks (RBs) with $N_{cs}$ cyclic shifts per resource block. As illustrated, the feedback message corresponding to the sidelink message 505 is transmitted using resource block 530 of the sidelink resources of the PSFCH occasion 206-h.

Additionally, conflict indicators for resource reservations may be transmitted using PSFCH resources that are mapped using the same or a similar technique. Conflict indicators may be used for inter-UE coordination and may be carried via the PSFCH resources. A conflict indicator pool may be configured with a different set of frequency resources than the feedback for data transmission. The pool may be configured as sl-PSFCH-Conflict-RB-Set. If enabled for the resource pool shared with LTE, the NR conflict indicators may be mapped to the PSFCH resource based on the determination of the transmission resource set, as described herein. The slot (e.g., PSFCH occasion 205) in which the conflict indicator is transmitted may be based on the configuration parameter PSFCHOccassionScheme2. In some cases, the PSFCH slot may be $T_{PSFCH}^{Prep}$ away from the SCI received with the conflicting reservation. In other cases, the PSFCH slot may be some time, $T_{proc}^{conficit}$, before the future reserved slot. In response to determining the transmission resource set and the PSFCH occasion 205 for conflict indication, the sidelink UE may map the conflicting SCI or reservation based on the enumeration technique described herein with respect to FIG. 5 (e.g., based on the subchannel where the SCI carrying the resource reservation is received). The conflict indication may be transmitted in the mapped PSFCH resource (e.g., a RB of the PSFCH occasion).

Figure 6:
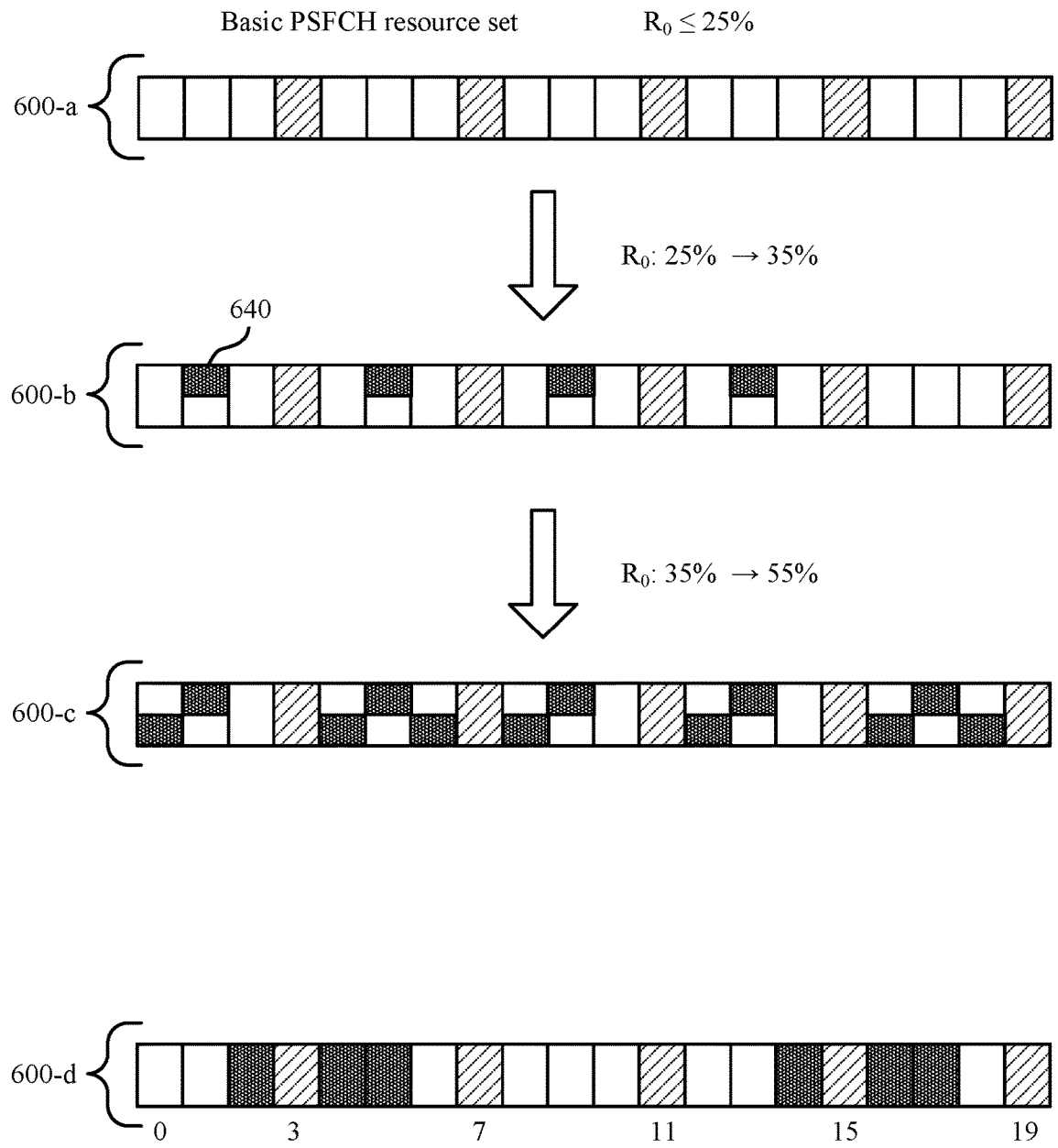
FIG. 6 illustrates an example of a resource diagram that supports feedback transmissions with adaptive and dynamic sidelink cochannel coexistence in accordance with one or more aspects of the present disclosure.

FIG. 6 illustrates an example of a resource diagram 600 that supports feedback transmissions with adaptive and dynamic sidelink cochannel coexistence in accordance with one or more aspects of the present disclosure. The resource diagram 600 may be implemented by one or more UEs 115, as described with respect to FIGS. 1 and 2. For example, the resource diagram 600 illustrates example procedures for dynamically mapping sidelink transmission occasions to PSFCH occasions of a shared sidelink resource pool that is shared between a first RAT (e.g., NR) and a second RAT (e.g., LTE). UEs 115 that are capable of communicating according to NR (or later) procedures may implement the techniques described with respect to FIG. 6 to identify sidelink transmission resources 210 and map the sidelink transmission resources 210 to PSFCH occasions 205.

As illustrated in resource diagram 600-a, a UE may be configured with a basic transmission resource set that contains the slots (e.g., PSFCH occasions 205) in a set of No slots. In some examples, the basic resource set contains all PSFCH occasions 205 for a set of slots. The UEs may adaptively add sidelink transmission resources 210 (e.g., PSSCH and PSCCH resources) based on the estimation of resource availability for the shared sidelink resource pool, and the resource availability may be the NR-to-LTE ratio ($R_0$), as described herein. The sidelink transmission resources 210 may be added to target a balanced mapping to PSFCH occasions 205. When $R_0$ is estimated to have increased, resources may be added to the resource pool in slot or half slot increments (e.g., 50 RBs), and any addition of sidelink transmission resources 210 may maintain a balanced PSFCH loading.

In resource diagram 600-a, the UE determines $R_0$ to be less than 25%. In such cases, the UE may determine that no sidelink transmission resources are available. In resource diagram 600-b, the UE may determine a $R_0$ value between 25% and 35%, and may add half-slot transmission resources (e.g., a half-slot transmission resource 640) and balance the additions across a quantity of PSFCH occasions 205. In resource diagram 600-c, the UE determines an $R_0$ value between 25% and 35%, and as such, the UE may add more half-slot transmission resources such the resources are balanced between the PSFCH occasions 205. As described herein, the UEs may map the transmission resources to PSFCH resources by enumerating the channels of the sidelink transmission occasions that are mapped to a PSFCH occasion 205. b In resource diagram 600-d, the PSFCH loading is imbalanced, as slots 7 and 19 have four mapped PSSCH slots (e.g., sidelink transmission resources 210) while the other PSFCH occasions have one mapped PSSCH slot. The UE may not load the PSFCH occasions with sidelink transmission resources 210 as illustrated in resource diagram 600-d or may not expect to receive communications based on such resources.

Figure 7:
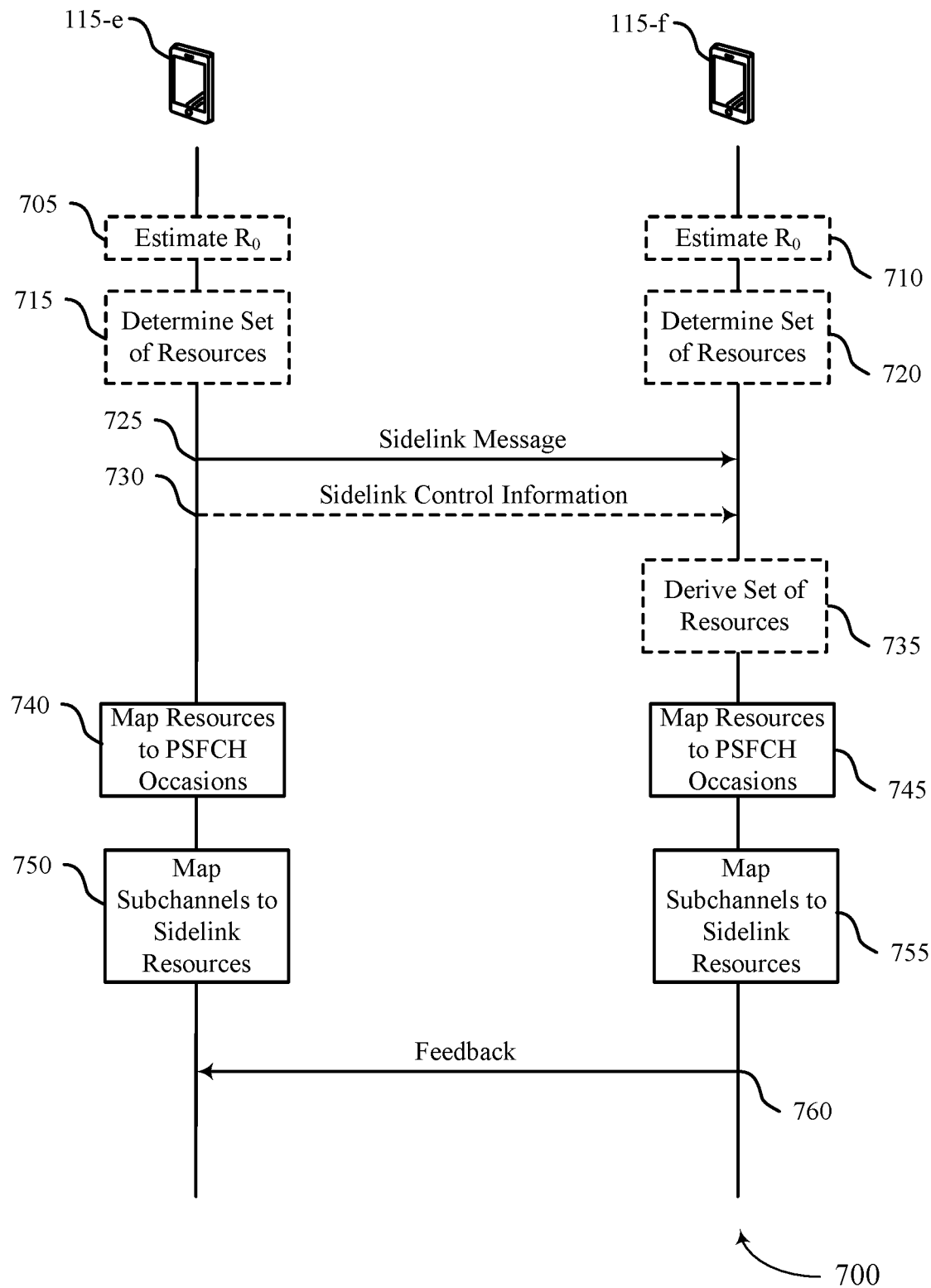
FIG. 7 illustrates an example of a process flow that supports feedback transmissions with adaptive and dynamic sidelink cochannel coexistence in accordance with one or more aspects of the present disclosure.

FIG. 7 illustrates an example of a process flow 700 that supports feedback transmissions with adaptive and dynamic sidelink cochannel coexistence in accordance with one or more aspects of the present disclosure. The process flow 700 includes a UE 115-e and a UE 115-f, which may be examples of the UEs 115 as described with respect to FIG. 2. The UEs 115-e and 115-f may support communications via a first RAT (e.g., NR), and the UEs 115-e and 115-f may communicate via a shared sidelink resource pool. In the following description of the process flow 700, the operations between the UE 115-e and the UE 115-f may be transmitted in a different order than the example order shown, or the operations performed may be performed in different orders or at different times. Some operations may also be omitted from the process flow 700, and other operations may be added to the process flow 700.

At 705, the UE 115-e may generate an estimation of resource availability in the shared sidelink resource pool. The estimation may correspond to a NR-to-LTE ratio in the shared sidelink resource pool and may be based on a quantity of devices per radio access technology, a channel occupancy per radio access technology, a traffic intensity per radio access technology, a channel measurement per radio access technology, a congestion measurement per radio access technology, or a combination thereof.

At 710, the UE 115-f may generate an estimation of resource availability in the shared sidelink resource pool. The estimation may correspond to a NR-to-LTE ratio in the shared sidelink resource pool and may be based on a quantity of devices per radio access technology, a channel occupancy per radio access technology, a traffic intensity per radio access technology, a channel measurement per radio access technology, a congestion measurement per radio access technology, or a combination thereof.

At 715, the UE 115-e may determine a set of sidelink transmission resources associated with communications according to the first RAT in the sidelink shared resource pool. For example, the UE 115-e may select the set of sidelink transmission resources of the sidelink resource pool based on the estimation of resource availability. In some examples, the UE 115-e may select a set of PSFCH occasions associated with the sidelink resource pool, and the selection may be based on the estimation of resource availability. The UE 115-e may select the set of sidelink transmission resources based on the selected set of PSFCH occasions. The selection of sidelink transmission resources may be based on targeting an equal quantity of sidelink transmission resources per PSFCH occasion or based on a threshold for mapping sidelink transmission resources per PSFCH occasion.

At 720, the UE 115-f may determine a set of sidelink transmission resources associated with communications according to the first RAT in the sidelink shared resource pool. For example, the UE 115-f may select the set of sidelink transmission resources of the sidelink resource pool based on the estimation of resource availability. In some examples, the UE 115-f may select a set of PSFCH occasions associated with the sidelink resource pool, and the selection may be based on the estimation of resource availability. The UE 115-f may select the set of sidelink transmission resources based on the selected set of PSFCH occasions. The selection of sidelink transmission resources may be based on targeting an equal quantity of sidelink transmission resources per PSFCH occasion or based on a threshold for mapping sidelink transmission resources per PSFCH occasion. In some examples, the set of transmission resources are determined based at least in part on being configured with a basic set of PSFCH occasions. In such cases, the UEs 115-e and 115-f may determine the sidelink transmission resources based on the resource availability estimation and in a manner that balances sidelink transmissions or such that a maximum fraction of transmission resources pre PSFCH occasion is not exceeded.

At 725, the UE 115-e may transmit, and the UE 115-f may receive, a sidelink message in a first sidelink transmission occasion of the set of sidelink transmission resources of a sidelink resource pool. The sidelink message is associated with the first RAT (e.g., NR).

At 730, the UE 115-e may transmit, and the UE 115-f may receive, sidelink control information. The sidelink control information may be transmitted as part of the sidelink message. The sidelink control information may be communicated via a subchannel of the first sidelink transmission occasion. In some examples, the sidelink control information may be control signaling that indicates a set of physical sidelink feedback channel occasions for an estimated set (by the UE 115-e) of sidelink transmissions associated with the first RAT. In some examples, the control signaling includes an index that is mapped to the set of PSFCH occasions of the sidelink resource pool. Additionally, or alternatively, the control signaling includes a bitmap that indicates the set of PSFCH occasions. The control signaling may be SCI-1 or SCI-2 signaling. The indicated PSFCH occasions may be different form the PSFCH occasions determined by the UE 115-f.

At 735, the UE 115-f may derive based at least in part on the control signaling, the set of sidelink transmission resources for the indicated set of PSFCH occasions. Deriving the set of transmission resources may include using the set of PSFCH occasions indicated by the control signaling, and deriving the sidelink transmission resources based on the PSFCH occasions. For example, the UE 115-f may update the set of sidelink transmission resources by adding a new sidelink transmission resource to the pool of sidelink resources or removing a sidelink transmission resource from the pool of sidelink resources. In some examples, the UE may derive the sidelink transmission resources to target an equal quantity of sidelink transmission resources per PSFCH occasion or based on a threshold for mapping sidelink transmission resources per PSFCH occasion.

At 740, the UE 115-*e* may map, based at least in part on a position of the first sidelink transmission occasion in the sidelink resource pool, the first sidelink transmission occasion to a physical sidelink feedback channel occasion associated with the first radio access technology. The mapping may include evaluating whether a position of each sidelink transmission occasion satisfies a time domain position constraint with respect to a time domain position of the physical sidelink feedback channel occasion. The position constraint may be a processing constraint, such as $T_{PSFCH}^{Prep}$.

At 745, the UE 115-*f* may map, based at least in part on a position of the first sidelink transmission occasion in the sidelink resource pool, the first sidelink transmission occasion to a physical sidelink feedback channel occasion associated with the first radio access technology. The mapping may include evaluating whether a position of each sidelink transmission occasion satisfies a time domain position constraint with respect to a time domain position of the physical sidelink feedback channel occasion. The position constraint may be a processing constraint, such as $T_{PSFCH}^{Prep}$.

At 750, the UE 115-*e* may map, starting with an earliest of sidelink transmission occasions mapped to the physical sidelink feedback channel occasion, each subchannel of the sidelink transmission occasions to a respective sidelink feedback resource of the PSFCH occasion. The mapping of subchannels may include assigning a respective number to each subchannel of the sidelink transmission occasions starting with a lowest subchannel in the earliest sidelink transmission occasion and mapping based on a respective number of each subchannel, each subchannel to the respective sidelink feedback resource (e.g., a RB of the PSFCH).

At 755, the UE 115-*f* may map starting with an earliest of sidelink transmission occasions mapped to the physical sidelink feedback channel occasion, each subchannel of the sidelink transmission occasions to a respective sidelink feedback resource of the PSFCH occasion. The mapping of subchannels may include assigning a respective number to each subchannel of the sidelink transmission occasions starting with a lowest subchannel in the earliest sidelink transmission occasion and mapping based on the respective number of each subchannel, each subchannel to the respective sidelink feedback resource (e.g., a RB of the PSFCH). In some examples, the SCI received at 730 may include a resource reservation. The UE 115-*f* may map the subchannel that includes the SCI to a RB in the PSFCH occasion (reserved for conflict indications) for transmitting a conflict indication. The mapping may include assigning respective numbers to the subchannels and mapping the subchannels to RBs in the PSFCH occasion reserved for conflict indications.

At 760, the UE 115-*f* may transmit, and the UE 115-*e* may receive via a resource of the physical sidelink feedback channel occasion mapped to a subchannel carrying sidelink control information associated with the sidelink message, a feedback message corresponding to the sidelink message. The feedback message may also include a conflict indication that is transmitted in a RB that is mapped as described herein.

Figure 8:
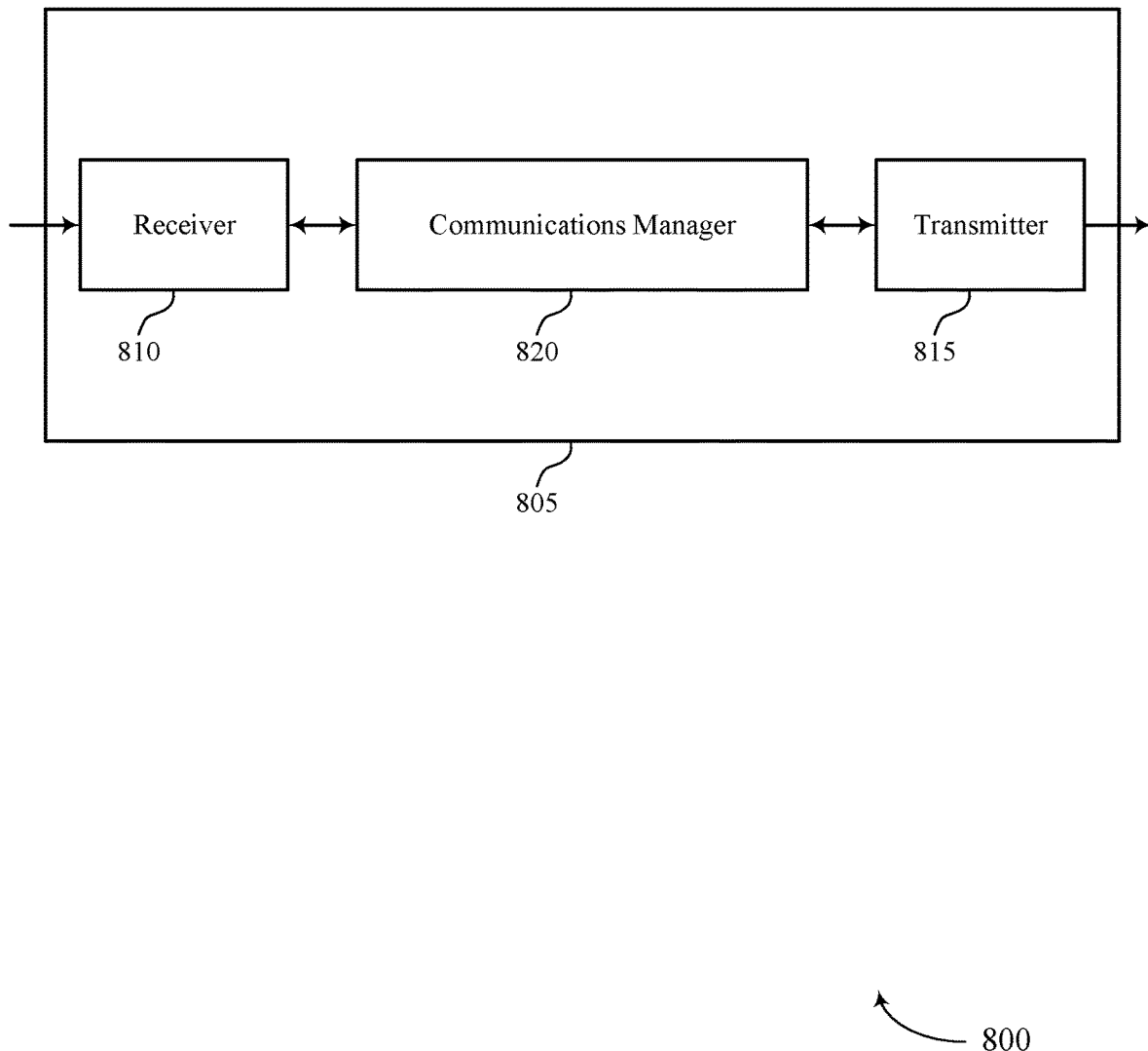
FIGS. 8 and 9 show block diagrams of devices that support feedback transmissions with adaptive and dynamic sidelink cochannel coexistence in accordance with one or more aspects of the present disclosure.

FIG. 8 shows a block diagram 800 of a device 805 that supports feedback transmissions with adaptive and dynamic sidelink cochannel coexistence in accordance with one or more aspects of the present disclosure. The device 805 may be an example of aspects of a UE 115 as described herein.

The device 805 may include a receiver 810, a transmitter 815, and a communications manager 820. The device 805 may also include a processor. Each of these components may be in communication with one another (e.g., via one or more buses).

The receiver 810 may provide a means for receiving information such as packets, user data, control information, or any combination thereof associated with various information channels (e.g., control channels, data channels, information channels related to feedback transmissions with adaptive and dynamic sidelink cochannel coexistence). Information may be passed on to other components of the device 805. The receiver 810 may utilize a single antenna or a set of multiple antennas.

The transmitter 815 may provide a means for transmitting signals generated by other components of the device 805. For example, the transmitter 815 may transmit information such as packets, user data, control information, or any combination thereof associated with various information channels (e.g., control channels, data channels, information channels related to feedback transmissions with adaptive and dynamic sidelink cochannel coexistence). In some examples, the transmitter 815 may be co-located with a receiver 810 in a transceiver module. The transmitter 815 may utilize a single antenna or a set of multiple antennas.

The communications manager 820, the receiver 810, the transmitter 815, or various combinations thereof or various components thereof may be examples of means for performing various aspects of feedback transmissions with adaptive and dynamic sidelink cochannel coexistence as described herein. For example, the communications manager 820, the receiver 810, the transmitter 815, or various combinations or components thereof may support a method for performing one or more of the functions described herein.

In some examples, the communications manager 820, the receiver 810, the transmitter 815, or various combinations or components thereof may be implemented in hardware (e.g., in communications management circuitry). The hardware may include a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 820, the receiver 810, the transmitter 815, or various combinations or components thereof may be implemented in code (e.g., as communications management software or firmware) executed by a processor. If implemented in code executed by a processor, the functions of the communications manager 820, the receiver 810, the transmitter 815, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 820 may be configured to perform various operations (e.g., receiving, obtaining, monitoring, outputting, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to obtain information, output information, or perform various other operations as described herein.

The communications manager 820 may support wireless communications at a first UE in accordance with examples as disclosed herein. For example, the communications manager 820 may be configured as or otherwise support a means for receiving a sidelink message in a first sidelink transmission occasion of a set of sidelink transmission resources of a sidelink resource pool shared by a first radio access technology and a second radio access technology, the set of sidelink transmission resources and the sidelink message associated with the first radio access technology. The communications manager 820 may be configured as or otherwise support a means for mapping, based at least in part on a position of the first sidelink transmission occasion in the sidelink resource pool, the first sidelink transmission occasion to a physical sidelink feedback channel occasion associated with the first radio access technology. The communications manager 820 may be configured as or otherwise support a means for mapping, starting with an earliest of sidelink transmission occasions mapped to the physical sidelink feedback channel occasion, each subchannel of the sidelink transmission occasions to a respective sidelink feedback resource of the physical sidelink feedback channel occasion. The communications manager 820 may be configured as or otherwise support a means for transmitting, via a resource of the physical sidelink feedback channel occasion mapped to a subchannel carrying sidelink control information associated with the sidelink message, a feedback message corresponding to the sidelink message.

Additionally, or alternatively, the communications manager 820 may support wireless communications at a first UE in accordance with examples as disclosed herein. For example, the communications manager 820 may be configured as or otherwise support a means for transmitting a sidelink message in a first sidelink transmission occasion of a set of sidelink transmission resources associated with a sidelink resource pool shared by a first radio access technology and a second radio access technology, the set of sidelink transmission resources and the sidelink message associated with the first radio access technology. The communications manager 820 may be configured as or otherwise support a means for mapping, based at least in part on a position of the first sidelink transmission occasion in the sidelink resource pool, the first sidelink transmission occasion to a physical sidelink feedback channel occasion associated with the first radio access technology. The communications manager 820 may be configured as or otherwise support a means for mapping, starting with an earliest of sidelink transmission occasions mapped to the physical sidelink feedback channel occasion, each subchannel of the sidelink transmission occasions to a respective sidelink feedback resource of the physical sidelink feedback channel occasion. The communications manager 820 may be configured as or otherwise support a means for receiving, via a resource of the physical sidelink feedback channel occasion mapped to a subchannel carrying sidelink control information associated with the sidelink message, a feedback message corresponding to the sidelink message.

By including or configuring the communications manager 820 in accordance with examples as described herein, the device 805 (e.g., a processor controlling or otherwise coupled with the receiver 810, the transmitter 815, the communications manager 820, or a combination thereof) may support techniques for efficient utilization of communication resources. For example, by using the shared sidelink resource pool techniques described here, various devices may communicate over sidelinks using different RATs while reducing or limiting interference, which supports improved resource utilization.

Figure 9:
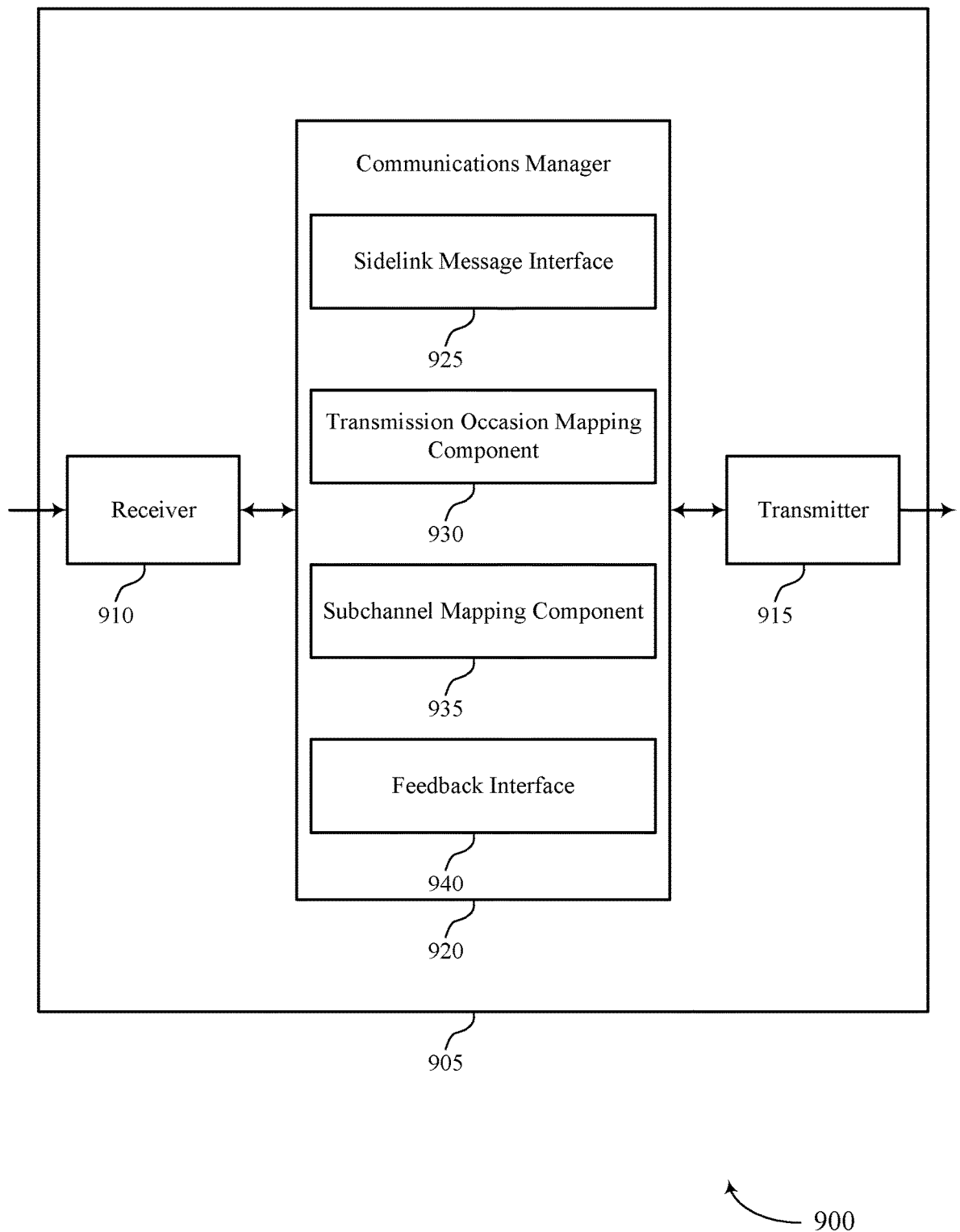

FIG. 9 shows a block diagram 900 of a device 905 that supports feedback transmissions with adaptive and dynamic sidelink cochannel coexistence in accordance with one or more aspects of the present disclosure. The device 905 may be an example of aspects of a device 805 or a UE 115 as described herein. The device 905 may include a receiver 910, a transmitter 915, and a communications manager 920. The device 905 may also include a processor. Each of these components may be in communication with one another (e.g., via one or more buses).

The receiver 910 may provide a means for receiving information such as packets, user data, control information, or any combination thereof associated with various information channels (e.g., control channels, data channels, information channels related to feedback transmissions with adaptive and dynamic sidelink cochannel coexistence). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to feedback transmissions with adaptive and dynamic sidelink cochannel coexistence). In some examples, the transmitter 915 may be co-located with a receiver 910 in a transceiver module. The transmitter 915 may utilize a single antenna or a set of multiple antennas.

The device 905, or various components thereof, may be an example of means for performing various aspects of feedback transmissions with adaptive and dynamic sidelink cochannel coexistence as described herein. For example, the communications manager 920 may include a sidelink message interface 925, a transmission occasion mapping component 930, a subchannel mapping component 935, a feedback interface 940, or any combination thereof. The communications manager 920 may be an example of aspects of a communications manager 820 as described herein. In some examples, the communications manager 920, or various components thereof, may be configured to perform various operations (e.g., receiving, obtaining, monitoring, outputting, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to obtain information, output information, or perform various other operations as described herein.

The communications manager 920 may support wireless communications at a first UE in accordance with examples as disclosed herein. The sidelink message interface 925 may be configured as or otherwise support a means for receiving a sidelink message in a first sidelink transmission occasion of a set of sidelink transmission resources of a sidelink resource pool shared by a first radio access technology and a second radio access technology, the set of sidelink transmission resources and the sidelink message associated with the first radio access technology. The transmission occasion mapping component 930 may be configured as or otherwise support a means for mapping, based on a position of the first sidelink transmission occasion in the sidelink resource pool, the first sidelink transmission occasion to a physical sidelink feedback channel occasion associated with the first radio access technology. The subchannel mapping component 935 may be configured as or otherwise support a means for mapping, starting with an earliest of sidelink transmission occasions mapped to the physical sidelink feedback channel occasion, each subchannel of the sidelink transmission occasions to a respective sidelink feedback resource of the physical sidelink feedback channel occasion. The feedback interface 940 may be configured as or otherwise support a means for transmitting, via a resource of the physical sidelink feedback channel occasion mapped to a subchannel carrying sidelink control information associated with the sidelink message, a feedback message corresponding to the sidelink message.

Additionally, or alternatively, the communications manager 920 may support wireless communications at a first UE in accordance with examples as disclosed herein. The sidelink message interface 925 may be configured as or otherwise support a means for transmitting a sidelink message in a first sidelink transmission occasion of a set of sidelink transmission resources associated with a sidelink resource pool shared by a first radio access technology and a second radio access technology, the set of sidelink transmission resources and the sidelink message associated with the first radio access technology. The transmission occasion mapping component 930 may be configured as or otherwise support a means for mapping, based on a position of the first sidelink transmission occasion in the sidelink resource pool, the first sidelink transmission occasion to a physical sidelink feedback channel occasion associated with the first radio access technology. The subchannel mapping component 935 may be configured as or otherwise support a means for mapping, starting with an earliest of sidelink transmission occasions mapped to the physical sidelink feedback channel occasion, each subchannel of the sidelink transmission occasions to a respective sidelink feedback resource of the physical sidelink feedback channel occasion. The feedback interface 940 may be configured as or otherwise support a means for receiving, via a resource of the physical sidelink feedback channel occasion mapped to a subchannel carrying sidelink control information associated with the sidelink message, a feedback message corresponding to the sidelink message.

Figure 10:
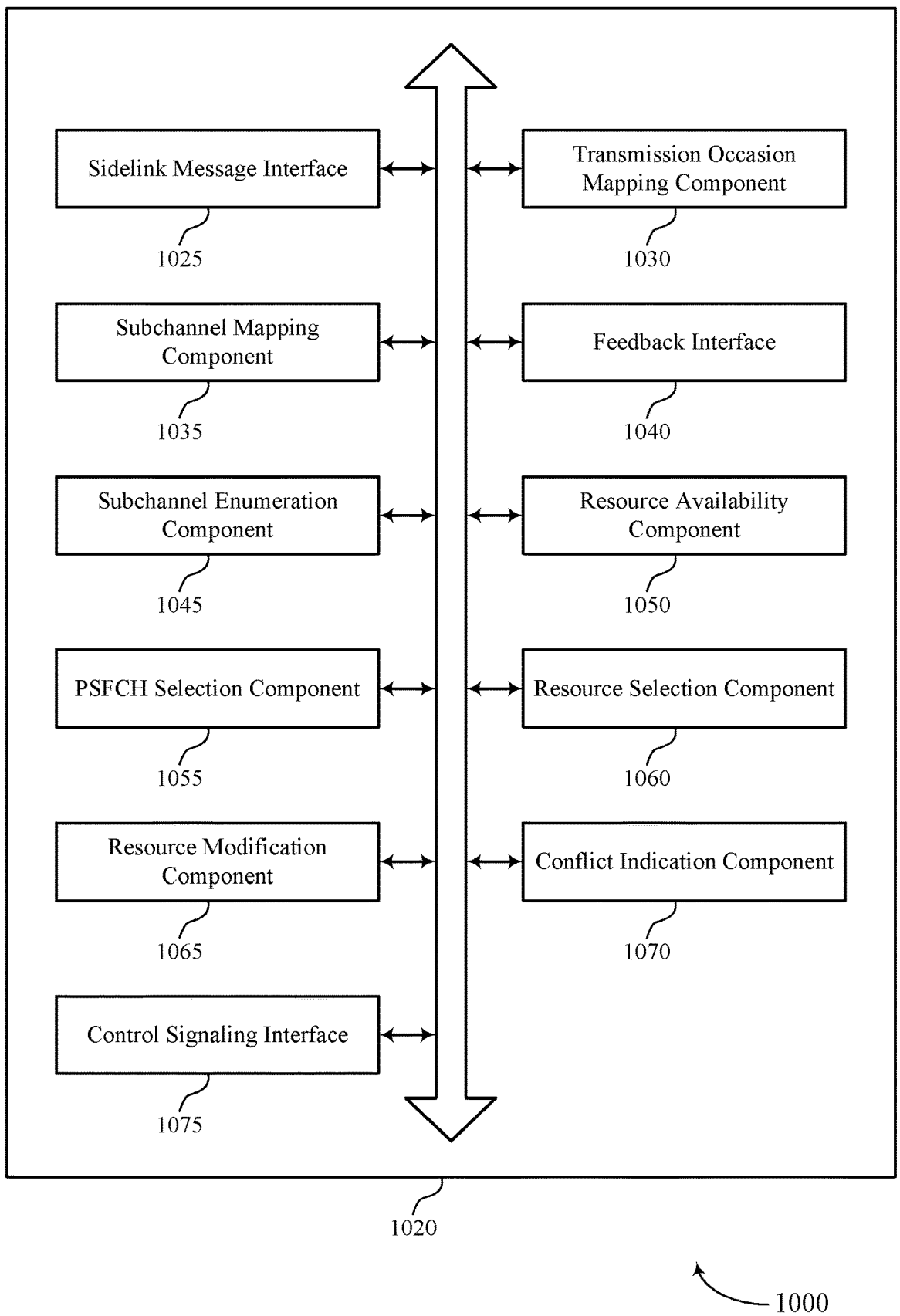
FIG. 10 shows a block diagram of a communications manager that supports feedback transmissions with adaptive and dynamic sidelink cochannel coexistence in accordance with one or more aspects of the present disclosure.

FIG. 10 shows a block diagram 1000 of a communications manager 1020 that supports feedback transmissions with adaptive and dynamic sidelink cochannel coexistence in accordance with one or more aspects of the present disclosure. The communications manager 1020 may be an example of aspects of a communications manager 820, a communications manager 920, or both, as described herein. The communications manager 1020, or various components thereof, may be an example of means for performing various aspects of feedback transmissions with adaptive and dynamic sidelink cochannel coexistence as described herein. For example, the communications manager 1020 may include a sidelink message interface 1025, a transmission occasion mapping component 1030, a subchannel mapping component 1035, a feedback interface 1040, a subchannel enumeration component 1045, a resource availability component 1050, an PSFCH selection component 1055, a resource selection component 1060, a resource modification component 1065, a conflict indication component 1070, a control signaling interface 1075, or any combination thereof. Each of these components may communicate, directly or indirectly, with one another (e.g., via one or more buses).

The communications manager 1020 may support wireless communications at a first UE in accordance with examples as disclosed herein. The sidelink message interface 1025 may be configured as or otherwise support a means for receiving a sidelink message in a first sidelink transmission occasion of a set of sidelink transmission resources of a sidelink resource pool shared by a first radio access technology and a second radio access technology, the set of sidelink transmission resources and the sidelink message associated with the first radio access technology. The transmission occasion mapping component 1030 may be configured as or otherwise support a means for mapping, based on a position of the first sidelink transmission occasion in the sidelink resource pool, the first sidelink transmission occasion to a physical sidelink feedback channel occasion associated with the first radio access technology. The subchannel mapping component 1035 may be configured as or otherwise support a means for mapping, starting with an earliest of sidelink transmission occasions mapped to the physical sidelink feedback channel occasion, each subchannel of the sidelink transmission occasions to a respective sidelink feedback resource of the physical sidelink feedback channel occasion. The feedback interface 1040 may be configured as or otherwise support a means for transmitting, via a resource of the physical sidelink feedback channel occasion mapped to a subchannel carrying sidelink control information associated with the sidelink message, a feedback message corresponding to the sidelink message.

In some examples, to support mapping each subchannel of sidelink transmission occasions, the subchannel enumeration component 1045 may be configured as or otherwise support a means for assigning a respective number to each subchannel of the sidelink transmission occasions starting with a lowest subchannel in the earliest sidelink transmission occasion. In some examples, to support mapping each subchannel of sidelink transmission occasions, the subchannel mapping component 1035 may be configured as or otherwise support a means for mapping, based on the respective number assigned to each subchannel, each subchannel to the respective sidelink feedback resource.

In some examples, to support mapping the sidelink transmission occasions, the transmission occasion mapping component 1030 may be configured as or otherwise support a means for evaluating whether a time domain position of each sidelink transmission occasion satisfies a time domain position constraint with respect to a position of the physical sidelink feedback channel occasion.

In some examples, the resource availability component 1050 may be configured as or otherwise support a means for generating an estimation of resource availability in the sidelink resource pool or communications using the first radio access technology. In some examples, the PSFCH selection component 1055 may be configured as or otherwise support a means for selecting, based on the estimation, a set of physical sidelink feedback channel occasions associated with the sidelink resource pool, the set of physical sidelink feedback channel occasions including the physical sidelink feedback channel occasion.

In some examples, the estimation is based on a quantity of devices per radio access technology, a channel occupancy per radio access technology, a traffic intensity per radio access technology, a channel measurement per radio access technology, a congestion measurement per radio access technology, or a combination thereof.

In some examples, the resource selection component 1060 may be configured as or otherwise support a means for selecting the set of sidelink transmission resources of the sidelink resource pool based on the set of physical sidelink feedback channel occasions.

In some examples, to support selecting the set of sidelink transmission resources, the resource selection component 1060 may be configured as or otherwise support a means for selecting an equal quantity of sidelink transmission resources per physical sidelink feedback channel occasion of the set of physical sidelink feedback channel occasions.

In some examples, the equal quantity is based on mappings of sidelink transmission occasions to physical sidelink feedback channel occasions.

In some examples, to support selecting the set of sidelink transmission resources, the resource selection component 1060 may be configured as or otherwise support a means for selecting a quantity of sidelink transmission resources such that a mapped quantity of sidelink transmission occasions to one of the set of physical sidelink feedback channel occasions does not exceed a threshold.

In some examples, the resource selection component 1060 may be configured as or otherwise support a means for determining that a prior quantity of sidelink transmission occasions that are mapped to one of a set of physical sidelink feedback channel occasions exceeds a threshold. In some examples, the resource modification component 1065 may be configured as or otherwise support a means for adding, based on determining that the prior quantity exceeds the threshold, an additional sidelink feedback channel occasion of the sidelink resource pool.

In some examples, the sidelink message interface 1025 may be configured as or otherwise support a means for receiving, via a second subchannel of one of the sidelink transmission occasions, second sidelink control information including indication of a resource reservation. In some examples, the conflict indication component 1070 may be configured as or otherwise support a means for transmitting, via a second resource of the physical sidelink feedback channel occasion mapped to the second subchannel and based on the resource reservation, a conflict indicator corresponding to the resource reservation.

In some examples, the resource availability component 1050 may be configured as or otherwise support a means for generating an estimation of resource availability in the sidelink resource pool for communications using the first radio access technology. In some examples, the resource selection component 1060 may be configured as or otherwise support a means for selecting the set of sidelink transmission resources based on a quantity of physical sidelink feedback channel occasions allocated for the sidelink resource pool and the estimation of resource availability.

In some examples, to support selecting the set of sidelink transmission resources, the resource selection component 1060 may be configured as or otherwise support a means for selecting the set of sidelink transmission resources such that a quantity of sidelink transmission occasions per mapped physical sidelink feedback channel occasion does not exceed a maximum fraction of the set of sidelink transmission resources.

In some examples, the transmission occasion mapping component 1030 may be configured as or otherwise support a means for mapping each sidelink transmission occasion to a respective physical sidelink feedback channel occasion based on a quantity of physical sidelink feedback channel occasions allocated to the sidelink resource pool.

In some examples, the control signaling interface 1075 may be configured as or otherwise support a means for receiving, from a second UE, control signaling indicating a set of physical sidelink feedback channel occasions for an estimated set of sidelink transmission resources associated with the first radio access technology. In some examples, the resource selection component 1060 may be configured as or otherwise support a means for deriving, based on the control signaling, the set of sidelink transmission resources for the indicated set of physical sidelink feedback channel occasions, where the subchannel carrying the sidelink control information is mapped to the resource of the physical sidelink feedback channel occasion based on a time-frequency location of the sidelink control information in the set of sidelink transmission resources.

In some examples, to support receiving the control signaling, the control signaling interface 1075 may be configured as or otherwise support a means for receiving an index that is mapped to the set of physical sidelink feedback channel occasions of the sidelink resource pool.

In some examples, to support receiving the control signaling, the control signaling interface 1075 may be configured as or otherwise support a means for receiving a bitmap that indicates the set of physical sidelink feedback channel occasions of the sidelink resource pool.

In some examples, the resource availability component 1050 may be configured as or otherwise support a means for generating an estimation of resource availability in the sidelink resource pool for communications using the first radio access technology, the estimation corresponding to a different set of sidelink transmission resources of the sidelink resource pool. In some examples, the subchannel mapping component 1035 may be configured as or otherwise support a means for mapping each sidelink transmission occasion of the set of sidelink transmission resources to a respective physical sidelink feedback channel occasion of the set of physical sidelink feedback channel occasions based on receiving the control signaling and the estimation corresponding to the different set of sidelink transmission resources.

In some examples, the resource modification component 1065 may be configured as or otherwise support a means for updating, based on receiving the control signaling, the set of sidelink transmission resources.

In some examples, to support updating the set of sidelink transmission resources, the resource modification component 1065 may be configured as or otherwise support a means for adding a new sidelink transmission resource to the set of sidelink transmission resources or removing a sidelink transmission resource from the set of sidelink transmission resources.

In some examples, to support receiving the control signaling, the control signaling interface 1075 may be configured as or otherwise support a means for receiving a type two sidelink control information message or a type two sidelink control information message.

In some examples, the first radio access technology is New Radio (NR) and the second radio access technology is long-term evolution (LTE).

Additionally, or alternatively, the communications manager 1020 may support wireless communications at a first UE in accordance with examples as disclosed herein. In some examples, the sidelink message interface 1025 may be configured as or otherwise support a means for transmitting a sidelink message in a first sidelink transmission occasion of a set of sidelink transmission resources associated with a sidelink resource pool shared by a first radio access technology and a second radio access technology, the set of sidelink transmission resources and the sidelink message associated with the first radio access technology. In some examples, the transmission occasion mapping component 1030 may be configured as or otherwise support a means for mapping, based on a position of the first sidelink transmission occasion in the sidelink resource pool, the first sidelink transmission occasion to a physical sidelink feedback channel occasion associated with the first radio access technology. In some examples, the subchannel mapping component 1035 may be configured as or otherwise support a means for mapping, starting with an earliest of sidelink transmission occasions mapped to the physical sidelink feedback channel occasion, each subchannel of the sidelink transmission occasions to a respective sidelink feedback resource of the physical sidelink feedback channel occasion. In some examples, the feedback interface 1040 may be configured as or otherwise support a means for receiving, via a resource of the physical sidelink feedback channel occasion mapped to a subchannel carrying sidelink control information associated with the sidelink message, a feedback message corresponding to the sidelink message.

In some examples, to support mapping each subchannel of the sidelink transmission occasions, the subchannel enumeration component 1045 may be configured as or otherwise support a means for assigning a respective number to each subchannel of the sidelink transmission occasions starting with a lowest subchannel in the earliest sidelink transmission occasion. In some examples, to support mapping each subchannel of the sidelink transmission occasions, the subchannel mapping component 1035 may be configured as or otherwise support a means for mapping, based on the respective number assigned to each subchannel, each subchannel to the respective sidelink feedback resource.

In some examples, to support mapping the sidelink transmission occasions, the transmission occasion mapping component 1030 may be configured as or otherwise support a means for evaluating whether a time domain position of each sidelink transmission occasion satisfies a time domain position constraint with respect to a position of the physical sidelink feedback channel occasion.

In some examples, the resource availability component 1050 may be configured as or otherwise support a means for generating an estimation of resource availability in the sidelink resource pool for communications using the first radio access technology. In some examples, the PSFCH selection component 1055 may be configured as or otherwise support a means for selecting, based on the estimation, a set of physical sidelink feedback channel occasions associated with the sidelink resource pool, the set of physical sidelink feedback channel occasions including the physical sidelink feedback channel occasion.

In some examples, the estimation is based on a quantity of devices per radio access technology, a channel occupancy per radio access technology, a traffic intensity per radio access technology, a channel measurement per radio access technology, a congestion measurement per radio access technology, or a combination thereof.

In some examples, the resource selection component 1060 may be configured as or otherwise support a means for selecting the set of sidelink transmission resources of the sidelink resource pool based on the set of physical sidelink feedback channel occasions.

In some examples, to support selecting the set of sidelink transmission resources, the resource selection component 1060 may be configured as or otherwise support a means for selecting an equal quantity of sidelink transmission resources per physical sidelink feedback channel occasion of the set of physical sidelink feedback channel occasions.

In some examples, the equal quantity is based on mappings of sidelink transmission occasions to physical sidelink feedback channel occasions.

In some examples, to support selecting the set of sidelink transmission resources, the resource selection component 1060 may be configured as or otherwise support a means for selecting a quantity of sidelink transmission resources such that a mapped quantity of sidelink transmission occasions to one of the set of physical sidelink feedback channel occasions does not exceed a threshold.

In some examples, the resource selection component 1060 may be configured as or otherwise support a means for determining that a prior quantity of sidelink transmission occasions that are mapped to one of a set of physical sidelink feedback channel occasions exceeds a threshold. In some examples, the resource modification component 1065 may be configured as or otherwise support a means for adding, based on determining that the prior quantity exceeds the threshold, an additional sidelink feedback channel occasion of the sidelink resource pool.

In some examples, the sidelink message interface 1025 may be configured as or otherwise support a means for transmitting, via a second subchannel of one of the sidelink transmission occasions, second sidelink control information including an indication of a resource reservation. In some examples, the conflict indication component 1070 may be configured as or otherwise support a means for receiving, via a second resource of the physical sidelink feedback channel occasion mapped to the second subchannel and based on the resource reservation, a conflict indicator corresponding to the resource reservation.

In some examples, the resource availability component 1050 may be configured as or otherwise support a means for generating an estimation of resource availability in the sidelink resource pool for communications using the first radio access technology. In some examples, the resource selection component 1060 may be configured as or otherwise support a means for selecting the set of sidelink transmission resources based on a quantity of physical sidelink feedback channel occasions allocated for the sidelink resource pool and the estimation of resource availability.

In some examples, to support selecting the set of sidelink transmission resources, the resource selection component 1060 may be configured as or otherwise support a means for selecting the set of sidelink transmission resources such that a quantity of sidelink transmission occasions per mapped physical sidelink feedback channel occasion does not exceed a maximum fraction of the set of sidelink transmission resources.

In some examples, the transmission occasion mapping component 1030 may be configured as or otherwise support a means for mapping each sidelink transmission occasion to a respective physical sidelink feedback channel occasion based on a quantity of physical sidelink feedback channel occasions allocated to the sidelink resource pool.

In some examples, the control signaling interface 1075 may be configured as or otherwise support a means for transmitting, to a first UE, control signaling indicating a set of physical sidelink feedback channel occasions for an estimated set of sidelink transmission resources associated with the first radio access technology, where the subchannel carrying the sidelink control information is mapped to the resource of the physical sidelink feedback channel occasion based on a time-frequency location of the sidelink control information in the set of sidelink transmission resources.

In some examples, to support transmitting the control signaling, the control signaling interface 1075 may be configured as or otherwise support a means for transmitting an index that is mapped to the set of physical sidelink feedback channel occasions of the sidelink resource pool.

In some examples, to support transmitting the control signaling, the control signaling interface 1075 may be configured as or otherwise support a means for transmitting a bitmap that indicates the set of physical sidelink feedback channel occasions of the sidelink resource pool.

In some examples, the resource availability component 1050 may be configured as or otherwise support a means for generating an estimation of resource availability in the sidelink resource pool for communications using the first radio access technology, the estimation corresponding to the estimated set of sidelink transmission resources of the sidelink resource pool and the control signaling transmitted based on the estimation.

In some examples, the PSFCH selection component 1055 may be configured as or otherwise support a means for selecting the set of sidelink transmission resources based on the indicated set of physical sidelink feedback channel occasions.

In some examples, to support transmitting the control signaling, the control signaling interface 1075 may be configured as or otherwise support a means for transmitting a type two sidelink control information message or a type two sidelink control information message.

In some examples, the first radio access technology is New Radio (NR) and the second radio access technology is long-term evolution (LTE).

Figure 11:
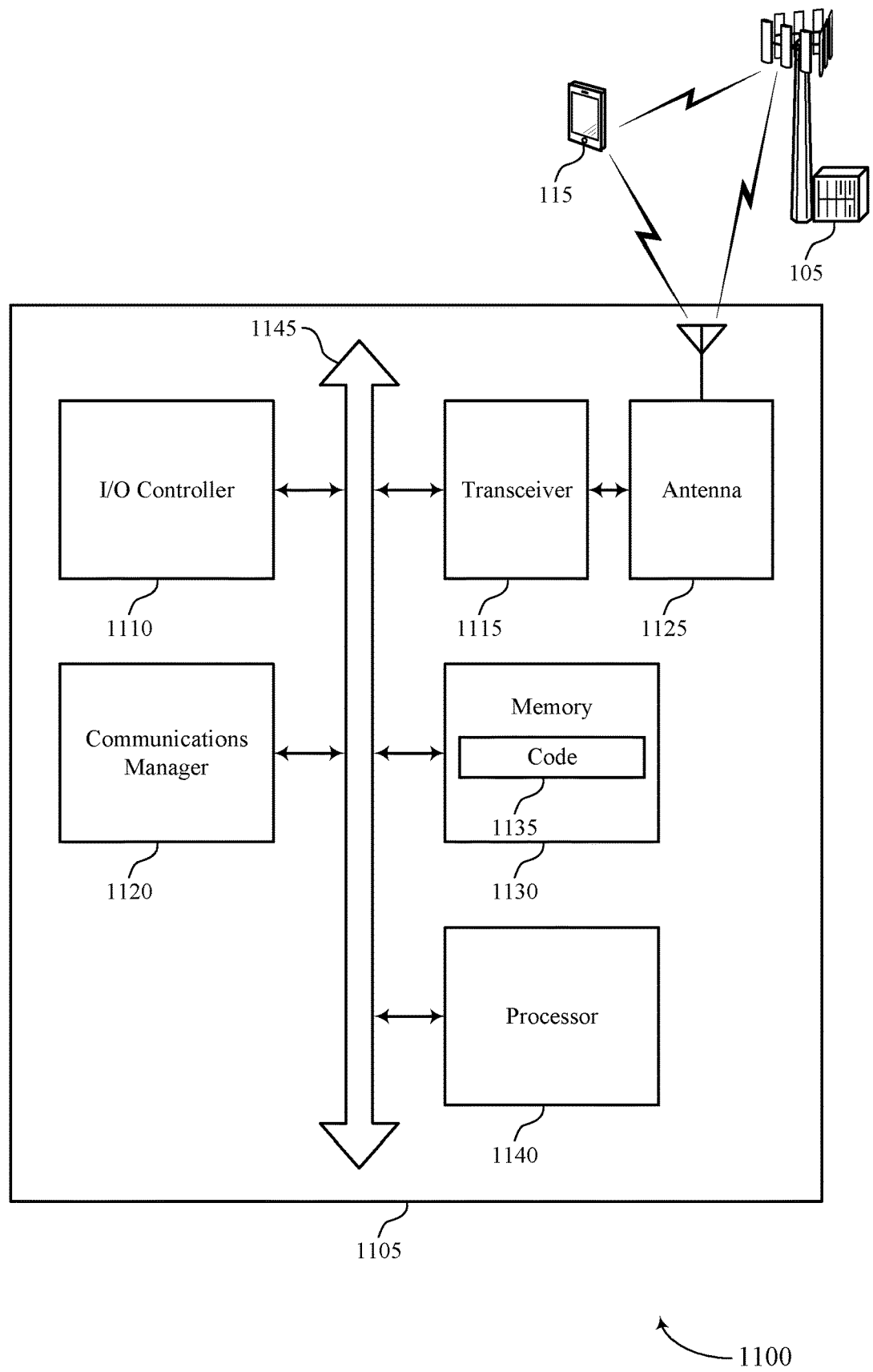
FIG. 11 shows a diagram of a system including a device that supports feedback transmissions with adaptive and dynamic sidelink cochannel coexistence in accordance with one or more aspects of the present disclosure.

FIG. 11 shows a diagram of a system 1100 including a device 1105 that supports feedback transmissions with adaptive and dynamic sidelink cochannel coexistence in accordance with one or more aspects of the present disclosure. The device 1105 may be an example of or include the components of a device 805, a device 905, or a UE 115 as described herein. The device 1105 may communicate (e.g., wirelessly) with one or more network entities 105, one or more UEs 115, or any combination thereof. The device 1105 may include components for bi-directional voice and data communications including components for transmitting and receiving communications, such as a communications manager 1120, an input/output (I/O) controller 1110, a transceiver 1115, an antenna 1125, a memory 1130, code 1135, and a processor 1140. These components may be in electronic communication or otherwise coupled (e.g., operatively, communicatively, functionally, electronically, electrically) via one or more buses (e.g., a bus 1145).

The I/O controller 1110 may manage input and output signals for the device 1105. The I/O controller 1110 may also manage peripherals not integrated into the device 1105. In some cases, the I/O controller 1110 may represent a physical connection or port to an external peripheral. In some cases, the I/O controller 1110 may utilize an operating system such as iOS®, ANDROID®, MS-DOS®, MS-WINDOWS®, OS/2®, UNIX®, LINUX®, or another known operating system. Additionally, or alternatively, the I/O controller 1110 may represent or interact with a modem, a keyboard, a mouse, a touchscreen, or a similar device. In some cases, the I/O controller 1110 may be implemented as part of a processor, such as the processor 1140. In some cases, a user may interact with the device 1105 via the I/O controller 1110 or via hardware components controlled by the I/O controller 1110.

In some cases, the device 1105 may include a single antenna 1125. However, in some other cases, the device 1105 may have more than one antenna 1125, which may be capable of concurrently transmitting or receiving multiple wireless transmissions. The transceiver 1115 may communicate bi-directionally, via the one or more antennas 1125, wired, or wireless links as described herein. For example, the transceiver 1115 may represent a wireless transceiver and may communicate bi-directionally with another wireless transceiver. The transceiver 1115 may also include a modem to modulate the packets, to provide the modulated packets to one or more antennas 1125 for transmission, and to demodulate packets received from the one or more antennas 1125. The transceiver 1115, or the transceiver 1115 and one or more antennas 1125, may be an example of a transmitter 815, a transmitter 915, a receiver 810, a receiver 910, or any combination thereof or component thereof, as described herein.

The memory 1130 may include random access memory (RAM) and read-only memory (ROM). The memory 1130 may store computer-readable, computer-executable code 1135 including instructions that, when executed by the processor 1140, cause the device 1105 to perform various functions described herein. The code 1135 may be stored in a non-transitory computer-readable medium such as system memory or another type of memory. In some cases, the code 1135 may not be directly executable by the processor 1140 but may cause a computer (e.g., when compiled and executed) to perform functions described herein. In some cases, the memory 1130 may contain, among other things, a basic I/O system (BIOS) which may control basic hardware or software operation such as the interaction with peripheral components or devices.

The processor 1140 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1140 may be configured to operate a memory array using a memory controller. In some other cases, a memory controller may be integrated into the processor 1140. The processor 1140 may be configured to execute computer-readable instructions stored in a memory (e.g., the memory 1130) to cause the device 1105 to perform various functions (e.g., functions or tasks supporting feedback transmissions with adaptive and dynamic sidelink cochannel coexistence). For example, the device 1105 or a component of the device 1105 may include a processor 1140 and memory 1130 coupled with or to the processor 1140, the processor 1140 and memory 1130 configured to perform various functions described herein.

The communications manager 1120 may support wireless communications at a first UE in accordance with examples as disclosed herein. For example, the communications manager 1120 may be configured as or otherwise support a means for receiving a sidelink message in a first sidelink transmission occasion of a set of sidelink transmission resources of a sidelink resource pool shared by a first radio access technology and a second radio access technology, the set of sidelink transmission resources and the sidelink message associated with the first radio access technology. The communications manager 1120 may be configured as or otherwise support a means for mapping, based at least in part on a position of the first sidelink transmission occasion in the sidelink resource pool, the first sidelink transmission occasion to a physical sidelink feedback channel occasion associated with the first radio access technology. The communications manager 1120 may be configured as or otherwise support a means for mapping, starting with an earliest of sidelink transmission occasions mapped to the physical sidelink feedback channel occasion, each subchannel of the sidelink transmission occasions to a respective sidelink feedback resource of the physical sidelink feedback channel occasion. The communications manager 1120 may be configured as or otherwise support a means for transmitting, via a resource of the physical sidelink feedback channel occasion mapped to a subchannel carrying sidelink control information associated with the sidelink message, a feedback message corresponding to the sidelink message.

Additionally, or alternatively, the communications manager 1120 may support wireless communications at a first UE in accordance with examples as disclosed herein. For example, the communications manager 1120 may be configured as or otherwise support a means for transmitting a sidelink message in a first sidelink transmission occasion of a set of sidelink transmission resources associated with a sidelink resource pool shared by a first radio access technology and a second radio access technology, the set of sidelink transmission resources and the sidelink message associated with the first radio access technology. The communications manager 1120 may be configured as or otherwise support a means for mapping, based at least in part on a position of the first sidelink transmission occasion in the sidelink resource pool, the first sidelink transmission occasion to a physical sidelink feedback channel occasion associated with the first radio access technology. The communications manager 1120 may be configured as or otherwise support a means for mapping, starting with an earliest of sidelink transmission occasions mapped to the physical sidelink feedback channel occasion, each subchannel of the sidelink transmission occasions to a respective sidelink feedback resource of the physical sidelink feedback channel occasion. The communications manager 1120 may be configured as or otherwise support a means for receiving, via a resource of the physical sidelink feedback channel occasion mapped to a subchannel carrying sidelink control information associated with the sidelink message, a feedback message corresponding to the sidelink message.

By including or configuring the communications manager 1120 in accordance with examples as described herein, the device 1105 may support techniques for more efficient utilization of communication resources. For example, by using the techniques described herein to utilize resources of a shared resource pool, various devices may communicate using resources of the shared resource pool in manner that limits or reduces interference across RATs.

In some examples, the communications manager 1120 may be configured to perform various operations (e.g., receiving, monitoring, transmitting) using or otherwise in cooperation with the transceiver 1115, the one or more antennas 1125, or any combination thereof. Although the communications manager 1120 is illustrated as a separate component, in some examples, one or more functions described with reference to the communications manager 1120 may be supported by or performed by the processor 1140, the memory 1130, the code 1135, or any combination thereof. For example, the code 1135 may include instructions executable by the processor 1140 to cause the device 1105 to perform various aspects of feedback transmissions with adaptive and dynamic sidelink cochannel coexistence as described herein, or the processor 1140 and the memory 1130 may be otherwise configured to perform or support such operations.

Figure 12:
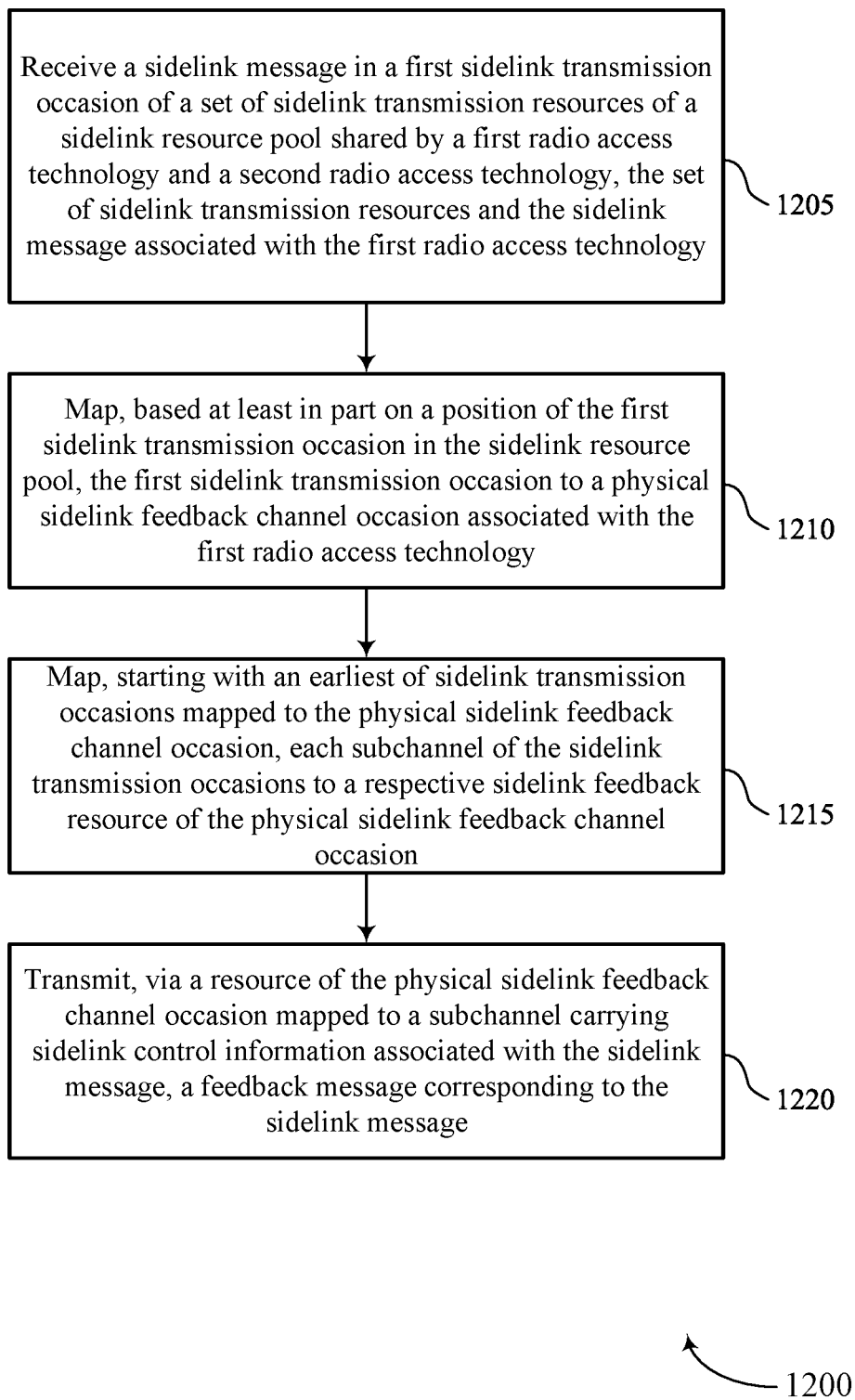
FIGS. 12 through 16 show flowcharts illustrating methods that support feedback transmissions with adaptive and dynamic sidelink cochannel coexistence in accordance with one or more aspects of the present disclosure.

FIG. 12 shows a flowchart illustrating a method 1200 that supports feedback transmissions with adaptive and dynamic sidelink cochannel coexistence in accordance with one or more aspects of the present disclosure. The operations of the method 1200 may be implemented by a UE or its components as described herein. For example, the operations of the method 1200 may be performed by a UE 115 as described with reference to FIGS. 1 through 11. In some examples, a UE may execute a set of instructions to control the functional elements of the UE to perform the described functions. Additionally, or alternatively, the UE may perform aspects of the described functions using special-purpose hardware.

At 1205, the method may include receiving a sidelink message in a first sidelink transmission occasion of a set of sidelink transmission resources of a sidelink resource pool shared by a first radio access technology and a second radio access technology, the set of sidelink transmission resources and the sidelink message associated with the first radio access technology. The operations of 1205 may be performed in accordance with examples as disclosed herein. In some examples, aspects of the operations of 1205 may be performed by a sidelink message interface 1025 as described with reference to FIG. 10.

At 1210, the method may include mapping, based on a position of the first sidelink transmission occasion in the sidelink resource pool, the first sidelink transmission occasion to a physical sidelink feedback channel occasion associated with the first radio access technology. The operations of 1210 may be performed in accordance with examples as disclosed herein. In some examples, aspects of the operations of 1210 may be performed by a transmission occasion mapping component 1030 as described with reference to FIG. 10.

At 1215, the method may include mapping, starting with an earliest of sidelink transmission occasions mapped to the physical sidelink feedback channel occasion, each subchannel of the sidelink transmission occasions to a respective sidelink feedback resource of the physical sidelink feedback channel occasion. The operations of 1215 may be performed in accordance with examples as disclosed herein. In some examples, aspects of the operations of 1215 may be performed by a subchannel mapping component 1035 as described with reference to FIG. 10.

At 1220, the method may include transmitting, via a resource of the physical sidelink feedback channel occasion mapped to a subchannel carrying sidelink control information associated with the sidelink message, a feedback message corresponding to the sidelink message. The operations of 1220 may be performed in accordance with examples as disclosed herein. In some examples, aspects of the operations of 1220 may be performed by a feedback interface 1040 as described with reference to FIG. 10.

Figure 13:
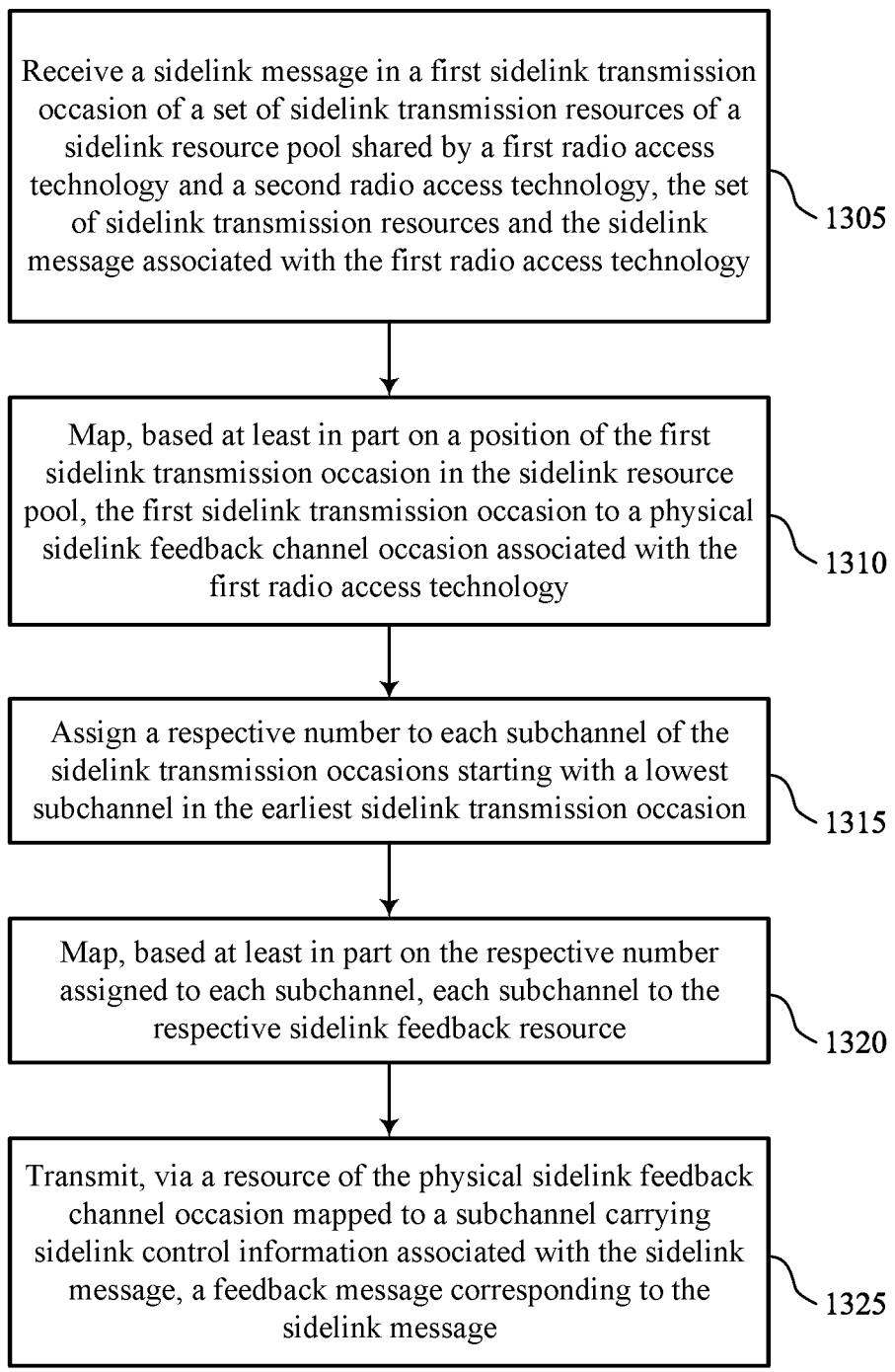

FIG. 13 shows a flowchart illustrating a method 1300 that supports feedback transmissions with adaptive and dynamic sidelink cochannel coexistence in accordance with one or more aspects of the present disclosure. The operations of the method 1300 may be implemented by a UE or its components as described herein. For example, the operations of the method 1300 may be performed by a UE 115 as described with reference to FIGS. 1 through 11. In some examples, a UE may execute a set of instructions to control the functional elements of the UE to perform the described functions. Additionally, or alternatively, the UE may perform aspects of the described functions using special-purpose hardware.

At 1305, the method may include receiving a sidelink message in a first sidelink transmission occasion of a set of sidelink transmission resources of a sidelink resource pool shared by a first radio access technology and a second radio access technology, the set of sidelink transmission resources and the sidelink message associated with the first radio access technology. The operations of 1305 may be performed in accordance with examples as disclosed herein. In some examples, aspects of the operations of 1305 may be performed by a sidelink message interface 1025 as described with reference to FIG. 10.

At 1310, the method may include mapping, based on a position of the first sidelink transmission occasion in the sidelink resource pool, the first sidelink transmission occasion to a physical sidelink feedback channel occasion associated with the first radio access technology. The operations of 1310 may be performed in accordance with examples as disclosed herein. In some examples, aspects of the operations of 1310 may be performed by a transmission occasion mapping component 1030 as described with reference to FIG. 10.

At 1315, the method may include assigning a respective number to each subchannel of the sidelink transmission occasions starting with a lowest subchannel in the earliest sidelink transmission occasion. The operations of 1315 may be performed in accordance with examples as disclosed herein. In some examples, aspects of the operations of 1315 may be performed by a subchannel enumeration component 1045 as described with reference to FIG. 10.

At 1320, the method may include mapping, based on the respective number assigned to each subchannel, each subchannel to the respective sidelink feedback resource. The operations of 1320 may be performed in accordance with examples as disclosed herein. In some examples, aspects of the operations of 1320 may be performed by a subchannel mapping component 1035 as described with reference to FIG. 10.

At 1325, the method may include transmitting, via a resource of the physical sidelink feedback channel occasion mapped to a subchannel carrying sidelink control information associated with the sidelink message, a feedback message corresponding to the sidelink message. The operations of 1325 may be performed in accordance with examples as disclosed herein. In some examples, aspects of the operations of 1325 may be performed by a feedback interface 1040 as described with reference to FIG. 10.

Figure 14:
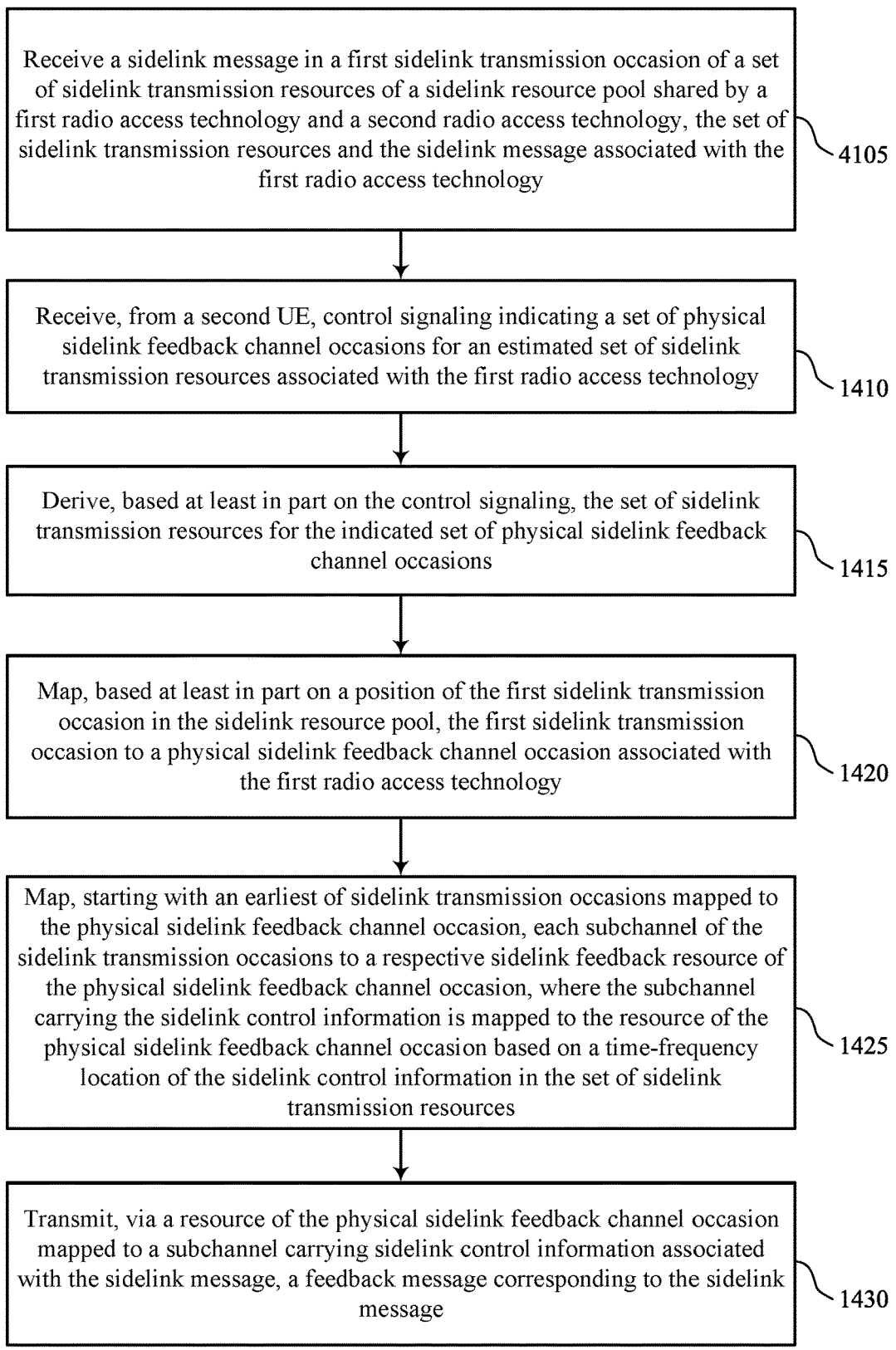

FIG. 14 shows a flowchart illustrating a method 1400 that supports feedback transmissions with adaptive and dynamic sidelink cochannel coexistence in accordance with one or more aspects of the present disclosure. The operations of the method 1400 may be implemented by a UE or its components as described herein. For example, the operations of the method 1400 may be performed by a UE 115 as described with reference to FIGS. 1 through 11. In some examples, a UE may execute a set of instructions to control the functional elements of the UE to perform the described functions. Additionally, or alternatively, the UE may perform aspects of the described functions using special-purpose hardware.

At 1405, the method may include receiving a sidelink message in a first sidelink transmission occasion of a set of sidelink transmission resources of a sidelink resource pool shared by a first radio access technology and a second radio access technology, the set of sidelink transmission resources and the sidelink message associated with the first radio access technology. The operations of 1405 may be performed in accordance with examples as disclosed herein. In some examples, aspects of the operations of 1405 may be performed by a sidelink message interface 1025 as described with reference to FIG. 10.

At 1410, the method may include receiving, from a second UE, control signaling indicating a set of physical sidelink feedback channel occasions for an estimated set of sidelink transmission resources associated with the first radio access technology. The operations of 1410 may be performed in accordance with examples as disclosed herein. In some examples, aspects of the operations of 1410 may be performed by a control signaling interface 1075 as described with reference to FIG. 10.

At 1415, the method may include deriving, based on the control signaling, the set of sidelink transmission resources for the indicated set of physical sidelink feedback channel occasions. The operations of 1415 may be performed in accordance with examples as disclosed herein. In some examples, aspects of the operations of 1415 may be performed by a resource selection component 1060 as described with reference to FIG. 10.

At 1420, the method may include mapping, based on a position of the first sidelink transmission occasion in the sidelink resource pool, the first sidelink transmission occasion to a physical sidelink feedback channel occasion associated with the first radio access technology. The operations of 1420 may be performed in accordance with examples as disclosed herein. In some examples, aspects of the operations of 1420 may be performed by a transmission occasion mapping component 1030 as described with reference to FIG. 10.

At 1425, the method may include mapping, starting with an earliest of sidelink transmission occasions mapped to the physical sidelink feedback channel occasion, each subchannel of the sidelink transmission occasions to a respective sidelink feedback resource of the physical sidelink feedback channel occasion. The subchannel carrying the sidelink control information is mapped to the resource of the physical sidelink feedback channel occasion based on a time-frequency location of the sidelink control information in the set of sidelink transmission resources The operations of 1425 may be performed in accordance with examples as disclosed herein. In some examples, aspects of the operations of 1425 may be performed by a subchannel mapping component 1035 as described with reference to FIG. 10.

At 1430, the method may include transmitting, via a resource of the physical sidelink feedback channel occasion mapped to a subchannel carrying sidelink control information associated with the sidelink message, a feedback message corresponding to the sidelink message. The operations of 1430 may be performed in accordance with examples as disclosed herein. In some examples, aspects of the operations of 1430 may be performed by a feedback interface 1040 as described with reference to FIG. 10.

Figure 15:
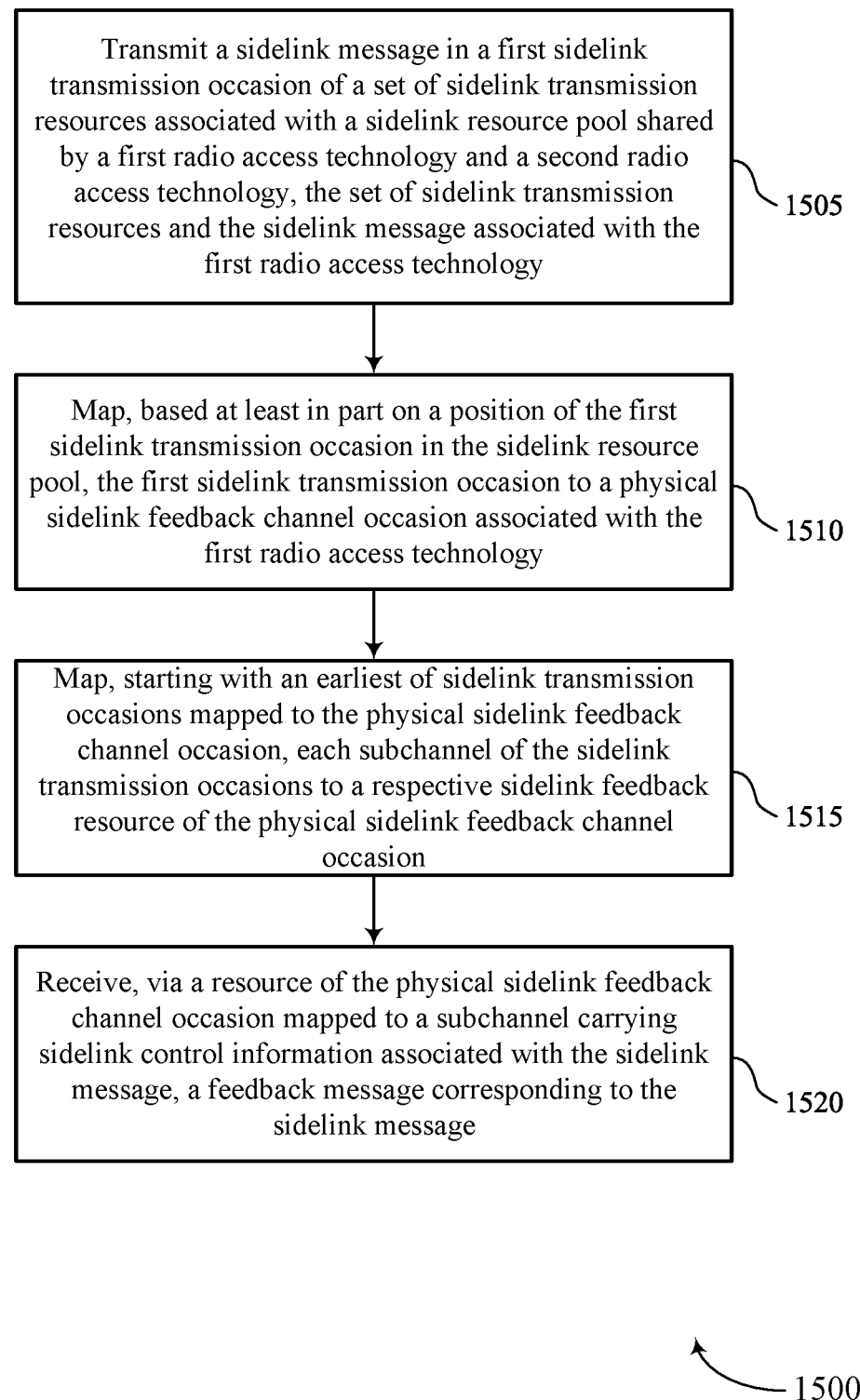

FIG. 15 shows a flowchart illustrating a method 1500 that supports feedback transmissions with adaptive and dynamic sidelink cochannel coexistence in accordance with one or more aspects of the present disclosure. The operations of the method 1500 may be implemented by a UE or its components as described herein. For example, the operations of the method 1500 may be performed by a UE 115 as described with reference to FIGS. 1 through 11. In some examples, a UE may execute a set of instructions to control the functional elements of the UE to perform the described functions. Additionally, or alternatively, the UE may perform aspects of the described functions using special-purpose hardware.

At 1505, the method may include transmitting a sidelink message in a first sidelink transmission occasion of a set of sidelink transmission resources associated with a sidelink resource pool shared by a first radio access technology and a second radio access technology, the set of sidelink transmission resources and the sidelink message associated with the first radio access technology. The operations of 1505 may be performed in accordance with examples as disclosed herein. In some examples, aspects of the operations of 1505 may be performed by a sidelink message interface 1025 as described with reference to FIG. 10.

At 1510, the method may include mapping, based on a position of the first sidelink transmission occasion in the sidelink resource pool, the first sidelink transmission occasion to a physical sidelink feedback channel occasion associated with the first radio access technology. The operations of 1510 may be performed in accordance with examples as disclosed herein. In some examples, aspects of the operations of 1510 may be performed by a transmission occasion mapping component 1030 as described with reference to FIG. 10.

At 1515, the method may include mapping, starting with an earliest of sidelink transmission occasions mapped to the physical sidelink feedback channel occasion, each subchannel of the sidelink transmission occasions to a respective sidelink feedback resource of the physical sidelink feedback channel occasion. The operations of 1515 may be performed in accordance with examples as disclosed herein. In some examples, aspects of the operations of 1515 may be performed by a subchannel mapping component 1035 as described with reference to FIG. 10.

At 1520, the method may include receiving, via a resource of the physical sidelink feedback channel occasion mapped to a subchannel carrying sidelink control information associated with the sidelink message, a feedback message corresponding to the sidelink message. The operations of 1520 may be performed in accordance with examples as disclosed herein. In some examples, aspects of the operations of 1520 may be performed by a feedback interface 1040 as described with reference to FIG. 10.

Figure 16:
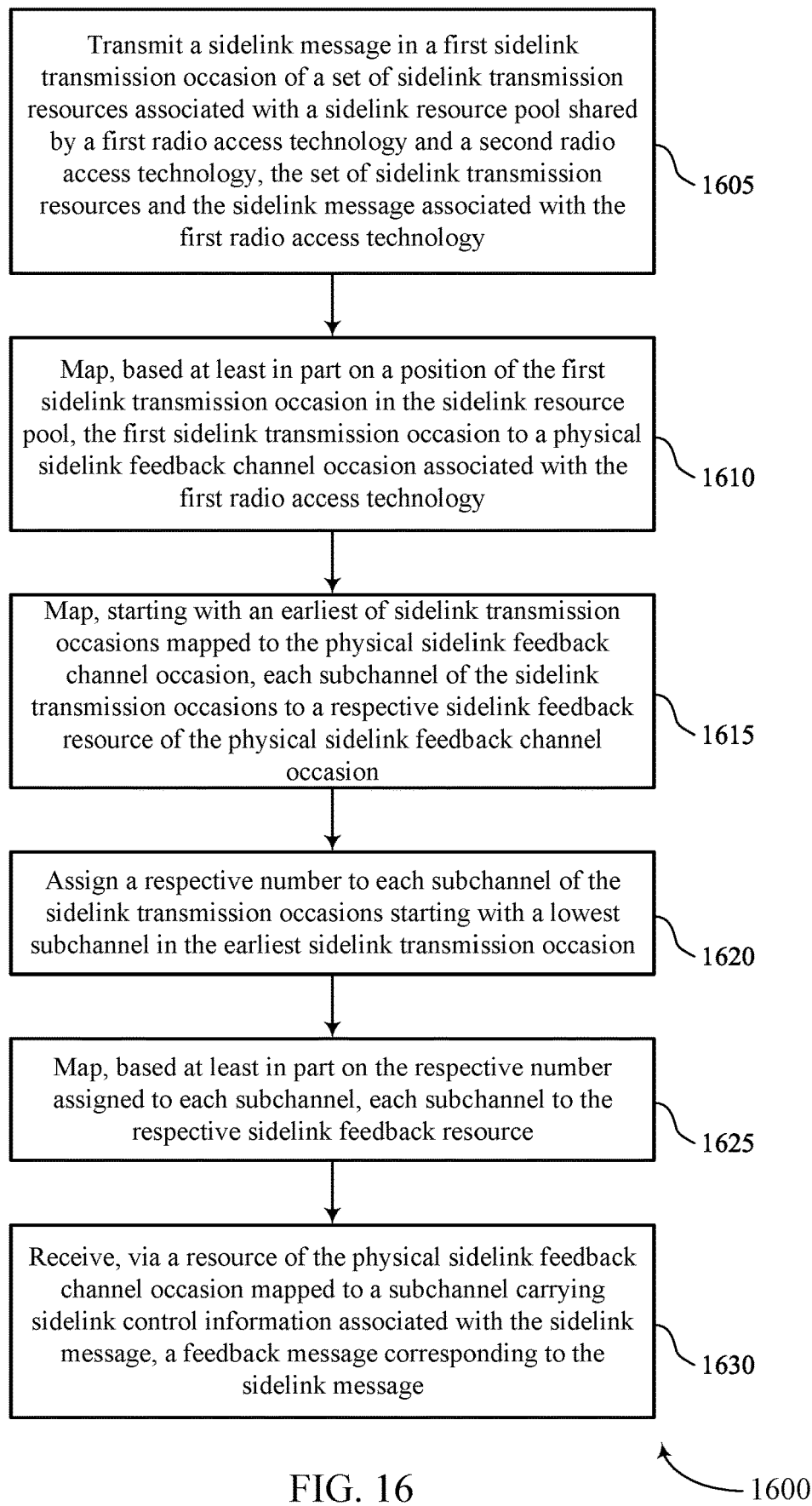

FIG. 16 shows a flowchart illustrating a method 1600 that supports feedback transmissions with adaptive and dynamic sidelink cochannel coexistence in accordance with one or more aspects of the present disclosure. The operations of the method 1600 may be implemented by a UE or its components as described herein. For example, the operations of the method 1600 may be performed by a UE 115 as described with reference to FIGS. 1 through 11. In some examples, a UE may execute a set of instructions to control the functional elements of the UE to perform the described functions. Additionally, or alternatively, the UE may perform aspects of the described functions using special-purpose hardware.

At 1605, the method may include transmitting a sidelink message in a first sidelink transmission occasion of a set of sidelink transmission resources associated with a sidelink resource pool shared by a first radio access technology and a second radio access technology, the set of sidelink transmission resources and the sidelink message associated with the first radio access technology. The operations of 1605 may be performed in accordance with examples as disclosed herein. In some examples, aspects of the operations of 1605 may be performed by a sidelink message interface 1025 as described with reference to FIG. 10.

At 1610, the method may include mapping, based on a position of the first sidelink transmission occasion in the sidelink resource pool, the first sidelink transmission occasion to a physical sidelink feedback channel occasion associated with the first radio access technology. The operations of 1610 may be performed in accordance with examples as disclosed herein. In some examples, aspects of the operations of 1610 may be performed by a transmission occasion mapping component 1030 as described with reference to FIG. 10.

At 1615, the method may include mapping, starting with an earliest of sidelink transmission occasions mapped to the physical sidelink feedback channel occasion, each subchannel of the sidelink transmission occasions to a respective sidelink feedback resource of the physical sidelink feedback channel occasion. The operations of 1615 may be performed in accordance with examples as disclosed herein. In some examples, aspects of the operations of 1615 may be performed by a subchannel mapping component 1035 as described with reference to FIG. 10.

At 1620, the method may include assigning a respective number to each subchannel of the sidelink transmission occasions starting with a lowest subchannel in the earliest sidelink transmission occasion. The operations of 1620 may be performed in accordance with examples as disclosed herein. In some examples, aspects of the operations of 1620 may be performed by a subchannel enumeration component 1045 as described with reference to FIG. 10.

At 1625, the method may include mapping, based on the respective number assigned to each subchannel, each subchannel to the respective sidelink feedback resource. The operations of 1625 may be performed in accordance with examples as disclosed herein. In some examples, aspects of the operations of 1625 may be performed by a subchannel mapping component 1035 as described with reference to FIG. 10.

At 1630, the method may include receiving, via a resource of the physical sidelink feedback channel occasion mapped to a subchannel carrying sidelink control information associated with the sidelink message, a feedback message corresponding to the sidelink message. The operations of 1630 may be performed in accordance with examples as disclosed herein. In some examples, aspects of the operations of 1630 may be performed by a feedback interface 1040 as described with reference to FIG. 10.

The following provides an overview of aspects of the present disclosure:

Aspect 1: A method for wireless communications at a first UE, comprising: receiving a sidelink message in a first sidelink transmission occasion of a set of sidelink transmission resources of a sidelink resource pool shared by a first radio access technology and a second radio access technology, the set of sidelink transmission resources and the sidelink message associated with the first radio access technology; mapping, based at least in part on a position of the first sidelink transmission occasion in the sidelink resource pool, the first sidelink transmission occasion to a physical sidelink feedback channel occasion associated with the first radio access technology; mapping, starting with an earliest of sidelink transmission occasions mapped to the physical sidelink feedback channel occasion, each subchannel of the sidelink transmission occasions to a respective sidelink feedback resource of the physical sidelink feedback channel occasion; and transmitting, via a resource of the physical sidelink feedback channel occasion mapped to a subchannel carrying sidelink control information associated with the sidelink message, a feedback message corresponding to the sidelink message.

Aspect 2: The method of aspect 1, wherein mapping each subchannel of sidelink transmission occasions comprises: assigning a respective number to each subchannel of the sidelink transmission occasions starting with a lowest subchannel in the earliest sidelink transmission occasion; and mapping, based at least in part on the respective number assigned to each subchannel, each subchannel to the respective sidelink feedback resource.

Aspect 3: The method of any of aspects 1 through 2, wherein mapping the sidelink transmission occasions comprises: evaluating whether a time domain position of each sidelink transmission occasion satisfies a time domain position constraint with respect to a position of the physical sidelink feedback channel occasion.

Aspect 4: The method of any of aspects 1 through 3, further comprising: generating an estimation of resource availability in the sidelink resource pool or communications using the first radio access technology; and selecting, based at least in part on the estimation, a set of physical sidelink feedback channel occasions associated with the sidelink resource pool, the set of physical sidelink feedback channel occasions including the physical sidelink feedback channel occasion.

Aspect 5: The method of aspect 4, wherein the estimation is based at least in part on a quantity of devices per radio access technology, a channel occupancy per radio access technology, a traffic intensity per radio access technology, a channel measurement per radio access technology, a congestion measurement per radio access technology, or a combination thereof Aspect 6: The method of any of aspects 4 through 5, further comprising: selecting the set of sidelink transmission resources of the sidelink resource pool based at least in part on the set of physical sidelink feedback channel occasions.

Aspect 7: The method of any of aspects 4 through 6, wherein selecting the set of sidelink transmission resources comprises: selecting an equal quantity of sidelink transmission resources per physical sidelink feedback channel occasion of the set of physical sidelink feedback channel occasions.

Aspect 8: The method of aspect 7, wherein the equal quantity is based at least in part on mappings of sidelink transmission occasions to physical sidelink feedback channel occasions.

Aspect 9: The method of any of aspects 4 through 6, wherein selecting the set of sidelink transmission resources comprises: selecting a quantity of sidelink transmission resources such that a mapped quantity of sidelink transmission occasions to one of the set of physical sidelink feedback channel occasions does not exceed a threshold.

Aspect 10: The method of any of aspects 1 through 6, further comprising: determining that a prior quantity of sidelink transmission occasions that are mapped to one of a set of physical sidelink feedback channel occasions exceeds a threshold; and adding, based at least in part on determining that the prior quantity exceeds the threshold, an additional sidelink feedback channel occasion of the sidelink resource pool.

Aspect 11: The method of any of aspects 1 through 10, further comprising: receiving, via a second subchannel of one of the sidelink transmission occasions, second sidelink control information comprising indication of a resource reservation; and transmitting, via a second resource of the physical sidelink feedback channel occasion mapped to the second subchannel and based at least in part on the resource reservation, a conflict indicator corresponding to the resource reservation.

Aspect 12: The method of any of aspects 1 through 11, further comprising: generating an estimation of resource availability in the sidelink resource pool for communications using the first radio access technology; and selecting the set of sidelink transmission resources based at least in part on a quantity of physical sidelink feedback channel occasions allocated for the sidelink resource pool and the estimation of resource availability.

Aspect 13: The method of aspect 12, wherein selecting the set of sidelink transmission resources comprises: selecting the set of sidelink transmission resources such that a quantity of sidelink transmission occasions per mapped physical sidelink feedback channel occasion does not exceed a maximum fraction of the set of sidelink transmission resources.

Aspect 14: The method of any of aspects 1 through 13, further comprising: mapping each sidelink transmission occasion to a respective physical sidelink feedback channel occasion based at least in part on a quantity of physical sidelink feedback channel occasions allocated to the sidelink resource pool.

Aspect 15: The method of any of aspects 1 through 14, further comprising: receiving, from a second UE, control signaling indicating a set of physical sidelink feedback channel occasions for an estimated set of sidelink transmission resources associated with the first radio access technology; and deriving, based at least in part on the control signaling, the set of sidelink transmission resources for the indicated set of physical sidelink feedback channel occasions, wherein the subchannel carrying the sidelink control information is mapped to the resource of the physical sidelink feedback channel occasion based at least in part on a time-frequency location of the sidelink control information in the set of sidelink transmission resources.

Aspect 16: The method of aspect 15, wherein receiving the control signaling comprises: receiving an index that is mapped to the set of physical sidelink feedback channel occasions of the sidelink resource pool.

Aspect 17: The method of any of aspect 15, wherein receiving the control signaling comprises: receiving a bitmap that indicates the set of physical sidelink feedback channel occasions of the sidelink resource pool.

Aspect 18: The method of any of aspects 15 through 17, further comprising: generating an estimation of resource availability in the sidelink resource pool for communications using the first radio access technology, the estimation corresponding to a different set of sidelink transmission resources of the sidelink resource pool; and mapping each sidelink transmission occasion of the set of sidelink transmission resources to a respective physical sidelink feedback channel occasion of the set of physical sidelink feedback channel occasions based at least in part on receiving the control signaling and the estimation corresponding to the different set of sidelink transmission resources.

Aspect 19: The method of any of aspects 15 through 18, further comprising: updating, based at least in part on receiving the control signaling, the set of sidelink transmission resources.

Aspect 20: The method of aspect 19, wherein updating the set of sidelink transmission resources comprises: adding a new sidelink transmission resource to the set of sidelink transmission resources or removing a sidelink transmission resource from the set of sidelink transmission resources.

Aspect 21: The method of any of aspects 15 through 20, wherein receiving the control signaling comprises: receiving a type two sidelink control information message or a type two sidelink control information message.

Aspect 22: The method of any of aspects 1 through 21, wherein the first radio access technology is New Radio (NR) and the second radio access technology is long-term evolution (LTE).

Aspect 23: A method for wireless communications at a first UE, comprising: transmitting a sidelink message in a first sidelink transmission occasion of a set of sidelink transmission resources associated with a sidelink resource pool shared by a first radio access technology and a second radio access technology, the set of sidelink transmission resources and the sidelink message associated with the first radio access technology; mapping, based at least in part on a position of the first sidelink transmission occasion in the sidelink resource pool, the first sidelink transmission occasion to a physical sidelink feedback channel occasion associated with the first radio access technology; mapping, starting with an earliest of sidelink transmission occasions mapped to the physical sidelink feedback channel occasion, each subchannel of the sidelink transmission occasions to a respective sidelink feedback resource of the physical sidelink feedback channel occasion; and receiving, via a resource of the physical sidelink feedback channel occasion mapped to a subchannel carrying sidelink control information associated with the sidelink message, a feedback message corresponding to the sidelink message.

Aspect 24: The method of aspect 23, wherein mapping each subchannel of the sidelink transmission occasions comprises: assigning a respective number to each subchannel of the sidelink transmission occasions starting with a lowest subchannel in the earliest sidelink transmission occasion; and mapping, based at least in part on the respective number assigned to each subchannel, each subchannel to the respective sidelink feedback resource.

Aspect 25: The method of any of aspects 23 through 24, wherein mapping the sidelink transmission occasions comprises: evaluating whether a time domain position of each sidelink transmission occasion satisfies a time domain position constraint with respect to a position of the physical sidelink feedback channel occasion.

Aspect 26: The method of any of aspects 23 through 25, further comprising: generating an estimation of resource availability in the sidelink resource pool for communications using the first radio access technology; and selecting, based at least in part on the estimation, a set of physical sidelink feedback channel occasions associated with the sidelink resource pool, the set of physical sidelink feedback channel occasions including the physical sidelink feedback channel occasion.

Aspect 27: The method of aspect 26, wherein the estimation is based at least in part on a quantity of devices per radio access technology, a channel occupancy per radio access technology, a traffic intensity per radio access technology, a channel measurement per radio access technology, a congestion measurement per radio access technology, or a combination thereof.

Aspect 28: The method of any of aspects 26 through 27, further comprising: selecting the set of sidelink transmission resources of the sidelink resource pool based at least in part on the set of physical sidelink feedback channel occasions.

Aspect 29: The method of aspect 28, wherein selecting the set of sidelink transmission resources comprises: selecting an equal quantity of sidelink transmission resources per physical sidelink feedback channel occasion of the set of physical sidelink feedback channel occasions.

Aspect 30: The method of aspect 29, wherein the equal quantity is based at least in part on mappings of sidelink transmission occasions to physical sidelink feedback channel occasions.

Aspect 31: The method of any of aspects 26 through 27, wherein selecting the set of sidelink transmission resources comprises: selecting a quantity of sidelink transmission resources such that a mapped quantity of sidelink transmission occasions to one of the set of physical sidelink feedback channel occasions does not exceed a threshold.

Aspect 32: The method of any of aspects 26 through 27, wherein further comprising: determining that a prior quantity of sidelink transmission occasions that are mapped to one of a set of physical sidelink feedback channel occasions exceeds a threshold; and adding, based at least in part on determining that the prior quantity exceeds the threshold, an additional sidelink feedback channel occasion of the sidelink resource pool.

Aspect 33: The method of any of aspects 23 through 32, further comprising: transmitting, via a second subchannel of one of the sidelink transmission occasions, second sidelink control information comprising an indication of a resource reservation; and receiving, via a second resource of the physical sidelink feedback channel occasion mapped to the second subchannel and based at least in part on the resource reservation, a conflict indicator corresponding to the resource reservation.

Aspect 34: The method of any of aspects 23 through 33, further comprising: generating an estimation of resource availability in the sidelink resource pool for communications using the first radio access technology; and selecting the set of sidelink transmission resources based at least in part on a quantity of physical sidelink feedback channel occasions allocated for the sidelink resource pool and the estimation of resource availability.

Aspect 35: The method of aspect 34, wherein selecting the set of sidelink transmission resources comprises: selecting the set of sidelink transmission resources such that a quantity of sidelink transmission occasions per mapped physical sidelink feedback channel occasion does not exceed a maximum fraction of the set of sidelink transmission resources.

Aspect 36: The method of any of aspects 23 through 35, further comprising: mapping each sidelink transmission occasion to a respective physical sidelink feedback channel occasion based at least in part on a quantity of physical sidelink feedback channel occasions allocated to the sidelink resource pool.

Aspect 37: The method of any of aspects 23 through 36, further comprising: transmitting, to a first UE, control signaling indicating a set of physical sidelink feedback channel occasions for an estimated set of sidelink transmission resources associated with the first radio access technology, wherein the subchannel carrying the sidelink control information is mapped to the resource of the physical sidelink feedback channel occasion based at least in part on a time-frequency location of the sidelink control information in the set of sidelink transmission resources.

Aspect 38: The method of aspect 37, wherein transmitting the control signaling comprises: transmitting an index that is mapped to the set of physical sidelink feedback channel occasions of the sidelink resource pool.

Aspect 39: The method of aspect 37, wherein transmitting the control signaling comprises: transmitting a bitmap that indicates the set of physical sidelink feedback channel occasions of the sidelink resource pool.

Aspect 40: The method of any of aspects 37 through 39, further comprising: generating an estimation of resource availability in the sidelink resource pool for communications using the first radio access technology, the estimation corresponding to the estimated set of sidelink transmission resources of the sidelink resource pool and the control signaling transmitted based at least in part on the estimation.

Aspect 41: The method of any of aspects 37 through 40, further comprising: selecting the set of sidelink transmission resources based at least in part on the indicated set of physical sidelink feedback channel occasions.

Aspect 42: The method of any of aspects 37 through 41, wherein transmitting the control signaling comprises: transmitting a type two sidelink control information message or a type two sidelink control information message.

Aspect 43: The method of any of aspects 23 through 42, wherein the first radio access technology is New Radio (NR) and the second radio access technology is long-term evolution (LTE).

Aspect 44: An apparatus for wireless communications at a first UE, comprising a processor; memory coupled with the processor; and instructions stored in the memory and executable by the processor to cause the apparatus to perform a method of any of aspects 1 through 22.

Aspect 45: An apparatus for wireless communications at a first UE, comprising at least one means for performing a method of any of aspects 1 through 22.

Aspect 46: A non-transitory computer-readable medium storing code for wireless communications at a first UE, the code comprising instructions executable by a processor to perform a method of any of aspects 1 through 22.

Aspect 47: An apparatus for wireless communications at a first UE, comprising a processor; memory coupled with the processor; and instructions stored in the memory and executable by the processor to cause the apparatus to perform a method of any of aspects 23 through 43.

Aspect 48: An apparatus for wireless communications at a first UE, comprising at least one means for performing a method of any of aspects 23 through 43.

Aspect 49: A non-transitory computer-readable medium storing code for wireless communications at a first UE, the code comprising instructions executable by a processor to perform a method of any of aspects 23 through 43.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (e.g., receiving information), accessing (e.g., accessing data stored in memory) and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus for wireless communications at a first user equipment (UE), comprising:
    a processor;
    memory coupled with the processor; and
    instructions stored in the memory and executable by the processor to cause the apparatus to:
        receive a sidelink message in a first sidelink transmission occasion of a set of sidelink transmission resources of a sidelink resource pool shared by a first radio access technology and a second radio access technology, the set of sidelink transmission resources and the sidelink message associated with the first radio access technology;
        map, based at least in part on a position of the first sidelink transmission occasion in the sidelink resource pool, the first sidelink transmission occasion to a physical sidelink feedback channel occasion associated with the first radio access technology;
        map, starting with an earliest of sidelink transmission occasions mapped to the physical sidelink feedback channel occasion, each subchannel of the sidelink transmission occasions to a respective sidelink feedback resource of the physical sidelink feedback channel occasion; and
        transmit, via a resource of the physical sidelink feedback channel occasion mapped to a subchannel carrying sidelink control information associated with the sidelink message, a feedback message corresponding to the sidelink message.

2. The apparatus of claim 1, wherein the instructions to map each subchannel of sidelink transmission occasions are executable by the processor to cause the apparatus to:
    assign a respective number to each subchannel of the sidelink transmission occasions starting with a lowest subchannel in the earliest sidelink transmission occasion; and
    map, based at least in part on the respective number assigned to each subchannel, each subchannel to the respective sidelink feedback resource.

3. The apparatus of claim 1, wherein the instructions to map the sidelink transmission occasions are executable by the processor to cause the apparatus to:
    evaluate whether a time domain position of each sidelink transmission occasion satisfies a time domain position constraint with respect to a position of the physical sidelink feedback channel occasion.

4. The apparatus of claim 1, wherein the instructions are further executable by the processor to cause the apparatus to:
    generate an estimation of resource availability in the sidelink resource pool or communications using the first radio access technology; and
    select, based at least in part on the estimation, a set of physical sidelink feedback channel occasions associated with the sidelink resource pool, the set of physical sidelink feedback channel occasions including the physical sidelink feedback channel occasion.

5. The apparatus of claim 4, wherein the estimation is based at least in part on a quantity of devices per radio access technology, a channel occupancy per radio access technology, a traffic intensity per radio access technology, a channel measurement per radio access technology, a congestion measurement per radio access technology, or a combination thereof.

6. The apparatus of claim 4, wherein the instructions are further executable by the processor to cause the apparatus to:
select the set of sidelink transmission resources of the sidelink resource pool based at least in part on the set of physical sidelink feedback channel occasions.

7. The apparatus of claim 4, wherein the instructions to select the set of sidelink transmission resources are executable by the processor to cause the apparatus to:
select an equal quantity of sidelink transmission resources per physical sidelink feedback channel occasion of the set of physical sidelink feedback channel occasions.

8. The apparatus of claim 7, wherein:
the equal quantity is based at least in part on mappings of sidelink transmission occasions to physical sidelink feedback channel occasions.

9. The apparatus of claim 4, wherein the instructions to select the set of sidelink transmission resources are executable by the processor to cause the apparatus to:
select a quantity of sidelink transmission resources such that a mapped quantity of sidelink transmission occasions to one of the set of physical sidelink feedback channel occasions does not exceed a threshold.

10. The apparatus of claim 1, wherein the instructions are further executable by the processor to cause the apparatus to:
determine that a prior quantity of sidelink transmission occasions that are mapped to one of a set of physical sidelink feedback channel occasions exceeds a threshold; and
add, based at least in part on determining that the prior quantity exceeds the threshold, an additional sidelink feedback channel occasion of the sidelink resource pool.

11. The apparatus of claim 1, wherein the instructions are further executable by the processor to cause the apparatus to:
receive, via a second subchannel of one of the sidelink transmission occasions, second sidelink control information comprising indication of a resource reservation; and
transmit, via a second resource of the physical sidelink feedback channel occasion mapped to the second subchannel and based at least in part on the resource reservation, a conflict indicator corresponding to the resource reservation.

12. The apparatus of claim 1, wherein the instructions are further executable by the processor to cause the apparatus to:
generate an estimation of resource availability in the sidelink resource pool for communications using the first radio access technology; and
select the set of sidelink transmission resources based at least in part on a quantity of physical sidelink feedback channel occasions allocated for the sidelink resource pool and the estimation of resource availability.

13. The apparatus of claim 12, wherein the instructions to select the set of sidelink transmission resources are executable by the processor to cause the apparatus to:
select the set of sidelink transmission resources such that a quantity of sidelink transmission occasions per mapped physical sidelink feedback channel occasion does not exceed a maximum fraction of the set of sidelink transmission resources.

14. The apparatus of claim 1, wherein the instructions are further executable by the processor to cause the apparatus to:
map each sidelink transmission occasion to a respective physical sidelink feedback channel occasion based at least in part on a quantity of physical sidelink feedback channel occasions allocated to the sidelink resource pool.

15. The apparatus of claim 1, wherein the instructions are further executable by the processor to cause the apparatus to:
receive, from a second UE, control signaling indicating a set of physical sidelink feedback channel occasions for an estimated set of sidelink transmission resources associated with the first radio access technology; and
derive, based at least in part on the control signaling, the set of sidelink transmission resources for the indicated set of physical sidelink feedback channel occasions, wherein the subchannel carrying the sidelink control information is mapped to the resource of the physical sidelink feedback channel occasion based at least in part on a time-frequency location of the sidelink control information in the set of sidelink transmission resources.

16. The apparatus of claim 15, wherein the instructions to receive the control signaling are executable by the processor to cause the apparatus to:
receive an index that is mapped to the set of physical sidelink feedback channel occasions of the sidelink resource pool.

17. The apparatus of claim 15, wherein the instructions to receive the control signaling are executable by the processor to cause the apparatus to:
receive a bitmap that indicates the set of physical sidelink feedback channel occasions of the sidelink resource pool.

18. The apparatus of claim 15, wherein the instructions are further executable by the processor to cause the apparatus to:
generate an estimation of resource availability in the sidelink resource pool for communications using the first radio access technology, the estimation corresponding to a different set of sidelink transmission resources of the sidelink resource pool; and
map each sidelink transmission occasion of the set of sidelink transmission resources to a respective physical sidelink feedback channel occasion of the set of physical sidelink feedback channel occasions based at least in part on receiving the control signaling and the estimation corresponding to the different set of sidelink transmission resources.

19. The apparatus of claim 15, wherein the instructions are further executable by the processor to cause the apparatus to:
update, based at least in part on receiving the control signaling, the set of sidelink transmission resources.

20. The apparatus of claim 19, wherein the instructions to update the set of sidelink transmission resources are executable by the processor to cause the apparatus to:
add a new sidelink transmission resource to the set of sidelink transmission resources or removing a sidelink transmission resource from the set of sidelink transmission resources.

21. The apparatus of claim 15, wherein the instructions to receive the control signaling are executable by the processor to cause the apparatus to:
receive a type two sidelink control information message or a type two sidelink control information message.

22. The apparatus of claim 1, wherein the first radio access technology is New Radio (NR) and the second radio access technology is long-term evolution (LTE).

23. A method for wireless communications at a first user equipment (UE), comprising:

receiving a sidelink message in a first sidelink transmission occasion of a set of sidelink transmission resources of a sidelink resource pool shared by a first radio access technology and a second radio access technology, the set of sidelink transmission resources and the sidelink message associated with the first radio access technology;

mapping, based at least in part on a position of the first sidelink transmission occasion in the sidelink resource pool, the first sidelink transmission occasion to a physical sidelink feedback channel occasion associated with the first radio access technology;

mapping, starting with an earliest of sidelink transmission occasions mapped to the physical sidelink feedback channel occasion, each subchannel of the sidelink transmission occasions to a respective sidelink feedback resource of the physical sidelink feedback channel occasion; and transmitting, via a resource of the physical sidelink feedback channel occasion mapped to a subchannel carrying sidelink control information associated with the sidelink message, a feedback message corresponding to the sidelink message.

24. The method of claim 23, wherein mapping each subchannel of sidelink transmission occasions comprises:
assigning a respective number to each subchannel of the sidelink transmission occasions starting with a lowest subchannel in the earliest sidelink transmission occasion; and
mapping, based at least in part on the respective number assigned to each subchannel, each subchannel to the respective sidelink feedback resource.

25. The method of claim 23, wherein mapping the sidelink transmission occasions comprises:
evaluating whether a time domain position of each sidelink transmission occasion satisfies a time domain position constraint with respect to a position of the physical sidelink feedback channel occasion.

26. The method of claim 23, further comprising:
generating an estimation of resource availability in the sidelink resource pool or communications using the first radio access technology; and
selecting, based at least in part on the estimation, a set of physical sidelink feedback channel occasions associated with the sidelink resource pool, the set of physical sidelink feedback channel occasions including the physical sidelink feedback channel occasion.

27. An apparatus for wireless communications at a first user equipment (UE), comprising:
means for receiving a sidelink message in a first sidelink transmission occasion of a set of sidelink transmission resources of a sidelink resource pool shared by a first radio access technology and a second radio access technology, the set of sidelink transmission resources and the sidelink message associated with the first radio access technology;
means for mapping, based at least in part on a position of the first sidelink transmission occasion in the sidelink resource pool, the first sidelink transmission occasion to a physical sidelink feedback channel occasion associated with the first radio access technology;
means for mapping, starting with an earliest of sidelink transmission occasions mapped to the physical sidelink feedback channel occasion, each subchannel of the sidelink transmission occasions to a respective sidelink feedback resource of the physical sidelink feedback channel occasion; and
means for transmitting, via a resource of the physical sidelink feedback channel occasion mapped to a subchannel carrying sidelink control information associated with the sidelink message, a feedback message corresponding to the sidelink message.

28. The apparatus of claim 27, wherein the means for mapping each subchannel of sidelink transmission occasions comprise:
means for assigning a respective number to each subchannel of the sidelink transmission occasions starting with a lowest subchannel in the earliest sidelink transmission occasion; and
means for mapping, based at least in part on the respective number assigned to each subchannel, each subchannel to the respective sidelink feedback resource.

29. A non-transitory computer-readable medium storing code for wireless communications at a first user equipment (UE), the code comprising instructions executable by a processor to:
receive a sidelink message in a first sidelink transmission occasion of a set of sidelink transmission resources of a sidelink resource pool shared by a first radio access technology and a second radio access technology, the set of sidelink transmission resources and the sidelink message associated with the first radio access technology;
map, based at least in part on a position of the first sidelink transmission occasion in the sidelink resource pool, the first sidelink transmission occasion to a physical sidelink feedback channel occasion associated with the first radio access technology;
map, starting with an earliest of sidelink transmission occasions mapped to the physical sidelink feedback channel occasion, each subchannel of the sidelink transmission occasions to a respective sidelink feedback resource of the physical sidelink feedback channel occasion; and
transmit, via a resource of the physical sidelink feedback channel occasion mapped to a subchannel carrying sidelink control information associated with the sidelink message, a feedback message corresponding to the sidelink message.

30. The non-transitory computer-readable medium of claim 29, wherein the instructions to mapping each subchannel of sidelink transmission occasions are executable by the processor to:
assign a respective number to each subchannel of the sidelink transmission occasions starting with a lowest subchannel in the earliest sidelink transmission occasion; and
map, based at least in part on the respective number assigned to each subchannel, each subchannel to the respective sidelink feedback resource.

* * * * *